(12) United States Patent
Saito et al.

(10) Patent No.: US 10,643,163 B2
(45) Date of Patent: May 5, 2020

(54) SCHEDULE DETERMINATION DEVICE AND SCHEDULE DETERMINATION PROGRAM

(71) Applicant: Kabushiki Kaisha Toshiba, Minato-ku (JP)

(72) Inventors: Masaaki Saito, Itabashi (JP); Dai Murayama, Musashino (JP); Yutaka Iino, Kawasaki (JP); Nagako Hisada, Koganei (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 659 days.

(21) Appl. No.: 15/262,264

(22) Filed: Sep. 12, 2016

(65) Prior Publication Data

US 2016/0379149 A1    Dec. 29, 2016

Related U.S. Application Data

(63) Continuation of application No. PCT/JP2014/082131, filed on Dec. 4, 2014.

(30) Foreign Application Priority Data

May 30, 2014 (JP) .................. 2014-113321

(51) Int. Cl.
*G06Q 10/06* (2012.01)
*G06Q 50/06* (2012.01)
(Continued)

(52) U.S. Cl.
CPC ....... *G06Q 10/06316* (2013.01); *G06Q 50/06* (2013.01); *H02J 3/383* (2013.01); *H02J 3/386* (2013.01); *H02J 15/00* (2013.01)

(58) Field of Classification Search
CPC .......................................... G06Q 10/00–50/00
(Continued)

(56) References Cited

U.S. PATENT DOCUMENTS 5,566,084 A * 10/1996 Cmar ................. G05D 23/1902
                                                              700/276
6,577,962 B1 * 6/2003 Afshari .................. G06Q 10/06
                                                              702/61
(Continued)

FOREIGN PATENT DOCUMENTS

EP    2 226 754 A1    9/2010
EP    2 919 349 A1    9/2015
(Continued)

OTHER PUBLICATIONS

Motegi, Naoya, et al. "Web-based energy information systems for energy management and demand response in commercial buildings." (2003). (Year: 2003).*
(Continued)

*Primary Examiner* — Alan S Miller
(74) *Attorney, Agent, or Firm* — Oblon, McClelland, Maier & Neustadt, L.L.P.

(57) ABSTRACT

A schedule determination device includes an acquisitor, a setter, and a determiner. The acquisitor acquires indexes of an operation schedule of a device and constraint conditions of the indexes. The setter sets a second range, which is narrower than a first range set in the operation schedule before a change, as a range for values of variables that establish constraint conditions of indexes of a new operation schedule. The determiner determines the operation schedule of the device, using the variable values within the second range.

18 Claims, 17 Drawing Sheets

(51) Int. Cl.
*H02J 3/38* (2006.01)
*H02J 15/00* (2006.01)

(58) Field of Classification Search
USPC ................................. 705/7.11–7.42
See application file for complete search history.

(56) References Cited

U.S. PATENT DOCUMENTS

| | | | | |
|---|---|---|---|---|
| 8,417,391 | B1* | 4/2013 | Rombouts | G05B 13/02 700/291 |
| 8,457,802 | B1* | 6/2013 | Steven | G06Q 10/00 700/291 |
| 8,543,248 | B2* | 9/2013 | Iino | G06Q 10/06 700/291 |
| 8,825,219 | B2* | 9/2014 | Gheerardyn | G05B 13/02 700/296 |
| 2004/0230344 | A1* | 11/2004 | Gallupe | E04H 4/129 700/300 |
| 2005/0240427 | A1* | 10/2005 | Crichlow | G06Q 10/06 705/412 |
| 2010/0179704 | A1* | 7/2010 | Ozog | G06Q 50/06 700/291 |
| 2010/0222934 | A1* | 9/2010 | Iino | G06Q 10/06 700/291 |
| 2011/0231028 | A1* | 9/2011 | Ozog | G06Q 50/06 700/291 |
| 2012/0083927 | A1* | 4/2012 | Nakamura | H02J 3/381 700/278 |
| 2012/0101652 | A1* | 4/2012 | Shin | H02J 3/14 700/296 |
| 2012/0153725 | A1* | 6/2012 | Grohman | H02J 3/14 307/39 |
| 2012/0296482 | A1* | 11/2012 | Steven | G05B 13/02 700/291 |
| 2014/0067142 | A1* | 3/2014 | Steven | G06Q 10/00 700/291 |
| 2014/0094980 | A1* | 4/2014 | Saito | H02J 3/14 700/291 |
| 2014/0148963 | A1* | 5/2014 | Ozog | G06Q 10/06 700/291 |
| 2014/0188295 | A1* | 7/2014 | Saito | G05B 15/02 700/291 |
| 2015/0253795 | A1 | 9/2015 | Saito et al. | |
| 2015/0277467 | A1* | 10/2015 | Steven | G06Q 10/00 700/287 |

FOREIGN PATENT DOCUMENTS

| | | |
|---|---|---|
| JP | 3519321 | 4/2004 |
| JP | 2004-178156 A | 6/2004 |
| JP | 2005-92827 | 4/2005 |
| JP | 2013-174412 | 9/2013 |
| JP | 2014-96946 | 5/2014 |
| JP | 2015-56104 A | 3/2015 |
| WO | WO 02/27620 A1 | 4/2002 |

OTHER PUBLICATIONS

Kiliccote, Sila, Mary Ann Piette, and Girish Ghatikar. "Smart buildings and demand response." AIP Conference Proceedings. vol. 1401. No. 1. American Institute of Physics, 2011. (Year: 2011).*

Wang, Shengwei, Xue Xue, and Chengchu Yan. "Building power demand response methods toward smart grid." HVAC&R Research 20.6 (2014): 665-687. (Year: 2014).*

Palensky, Peter, et al. "Demand response with functional buildings using simplified process models." IECON 2011—37th Annual Conference of the IEEE Industrial Electronics Society. IEEE, 2011. (Year: 2011).*

Extended European Search Report dated Oct. 16, 2017 in Patent Application No. 14893309.6.

International Search Report dated Feb. 10, 2015 in PCT/JP2014/082131 filed on Dec. 4, 2014 (with English translation).

Written Opinion dated Feb. 10, 2015 in PCT/JP2014/082131 filed on Dec. 4, 2014.

Office Action dated Dec. 31, 2019 in Chinese Application No. 21480076875.8 (w/computer-generated English translation).

He Shujian, et al., Linear Programming and Network Technology, College East China Chemical Industry Press, Chapter 6, Jun. 30, 1989.

Office Action dated Dec. 31, 2019 in Chinese Application No. 201480076875.8 (w/computer-generated English translation).

* cited by examiner

FIG. 5

| VARIABLE NAME | PHYSICAL QUANTITY | UPPER/LOWER LIMIT | UNIT |
|---|---|---|---|
| X1 | RECEIVED POWER AMOUNT | $0 \leq X1 \leq$ CONTRACTED POWER | [kWh] |
| X2 | ABSORPTION WATER COOLING/ HEATING MACHINE LOAD RATIO (EXHAUSTED HEAT INTAKE MODE) | (LOWER LIMIT) $\leq X2 \leq 1$ | – |
| X3 | ABSORPTION WATER COOLING/ HEATING MACHINE LOAD RATIO (PRODUCTION OF COOLING WATER, USING GAS) | (LOWER LIMIT) $\leq X3 \leq 1$ | – |
| X4 | ABSORPTION WATER COOLING/ HEATING MACHINE LOAD RATIO (PRODUCTION OF HEATED WATER, USING GAS) | (LOWER LIMIT) $\leq X4 \leq 1$ | – |
| X5 | ELECTRIC FREEZER LOAD RATIO | (LOWER LIMIT) $\leq X5 \leq 1$ | – |
| X6 | CGS LOAD RATIO | (LOWER LIMIT) $\leq X6 \leq 1$ | – |
| X7 | REMAINING STORED HEAT AMOUNT | $0 \leq X7 \leq$ (HEAT STORAGE CAPACITY) | [kWh] |
| X8 | SOC (STATE OF CHARGE; REMAINING BATTERY CHARGE) | $0 \leq X8 \leq$ (RECHARGEABLE BATTERY CAPACITY) | [kWh] |

FIG. 6

| VARIABLE NAME | PHYSICAL QUANTITY | TIME | | | |
|---|---|---|---|---|---|
| | | 6:00 | 7:00 | 8:00 | 9:00 |
| X1 | RECEIVED POWER AMOUNT | – | – | – | – |
| X2 | ABSORPTION WATER COOLING/ HEATING MACHINE (EXHAUSTED HEAT INTAKE MODE) | ON | ON | ON | OFF |
| X3 | ABSORPTION WATER COOLING/ HEATING MACHINE (PRODUCTION OF COOLING WATER, USING GAS) | ON | ON | ON | OFF |
| X4 | ABSORPTION WATER COOLING/ HEATING MACHINE (PRODUCTION OF HEATED WATER, USING GAS) | OFF | OFF | OFF | OFF |
| X5 | ELECTRIC FREEZER | OFF | OFF | OFF | ON |
| X6 | CGS | OFF | OFF | ON | ON |
| X7 | REMAINING STORED HEAT AMOUNT | – | – | – | – |
| X8 | SOC (STATE OF CHARGE; REMAINING BATTERY CHARGE) | – | – | – | – |

FIG. 12

| VARIABLE NAME | PHYSICAL QUANTITY | TIME | | | |
|---|---|---|---|---|---|
| | | 6:00 | 7:00 | 8:00 | 9:00 |
| X1 | RECEIVED POWER AMOUNT | – | – | – | – |
| X2 | ABSORPTION WATER COOLING/ HEATING MACHINE (EXHAUSTED HEAT INTAKE MODE) | ON | ON | ON | OFF |
| X3 | ABSORPTION WATER COOLING/ HEATING MACHINE (PRODUCTION OF COOLING WATER, USING GAS) | OFF | OFF | OFF | OFF |
| X4 | ABSORPTION WATER COOLING/ HEATING MACHIN (PRODUCTION OF HEATED WATER, USING GAS) | OFF | OFF | OFF | OFF |
| X5 | ELECTRIC FREEZER | OFF | OFF | OFF | ON |
| X6 | CGS | OFF | OFF | ON | ON |
| X7 | REMAINING STORED HEAT AMOUNT | – | – | – | – |
| X8 | SOC (STATE OF CHARGE; REMAINING BATTERY CHARGE) | – | – | – | – |

FIG. 13

| VARIABLE NAME | PHYSICAL QUANTITY | TIME | | | |
|---|---|---|---|---|---|
| | | 6:00 | 7:00 | 8:00 | 9:00 |
| X1 | RECEIVED POWER AMOUNT | – | – | – | – |
| X2 | ABSORPTION-WATER COOLING/ HEATING MACHINE (EXHAUSTED HEAT INTAKE MODE) | ON | ON | ON | OFF |
| X3 | ABSORPTION-WATER COOLING/ HEATING MACHINE (PRODUCTION OF COOLING WATER, USING GAS) | ON | ON | ON | OFF |
| X4 | ABSORPTION-WATER COOLING/ HEATING MACHINE (PRODUCTION OF HEATED WATER, USING GAS) | OFF | OFF | OFF | OFF |
| X5 | ELECTRIC FREEZER | OFF | OFF | OFF | ON |
| X6 | CGS | OFF | OFF | ON | ON |
| X7 | REMAINING STORED HEAT AMOUNT | – | – | – | – |
| X8 | SOC (STATE OF CHARGE; REMAINING BATTERY CHARGE) | – | – | – | – |

SCHEDULE DETERMINATION DEVICE AND SCHEDULE DETERMINATION PROGRAM

FIELD OF ART

Embodiments of the present invention relate to a schedule determination device and a schedule determination program.

BACKGROUND ART

A schedule determination device sometimes determines an operation schedule of a device based on a demand response (DR) signal. However, there have been cases in which a schedule determination device has not been able to properly determine an operation schedule.

PRIOR ART REFERENCE

Patent Reference

[Patent Reference 1]: Japanese Patent No. 3519321

SUMMARY OF THE INVENTION

Issues to Be Solved by the Invention

Some issues that some embodiments of the present invention seek to solve are to provide a schedule determination device and a schedule determination program capable of properly determining an operation schedule.

Means to Solve the Problem

A schedule determination device of an embodiment has an acquisitor, a setter, and a determiner. The acquisitor acquires an index of the operation schedule of a device and a constraint condition of the index. The setter sets a second range that is narrower than a first range set in an operation schedule before a change as the range for the values of variables that establish constraint conditions of the indexes of a new operation schedule. The setter determines the operation schedule of a device, using the value of a variable within the second range.

BRIEF DESCRIPTION OF THE DRAWINGS

FIG. 5 shows the variables in the first embodiment.
FIG. 6 shows a new operation schedule in the first embodiment.
FIG. 12 shows an operation schedule before a change in the second embodiment.
FIG. 13 shows a new operation schedule in the second embodiment.

EMBODIMENTS

Embodiments of a schedule determination device and a schedule determination program will be described below, with references made to the drawings.

First Embodiment

Figure 1:
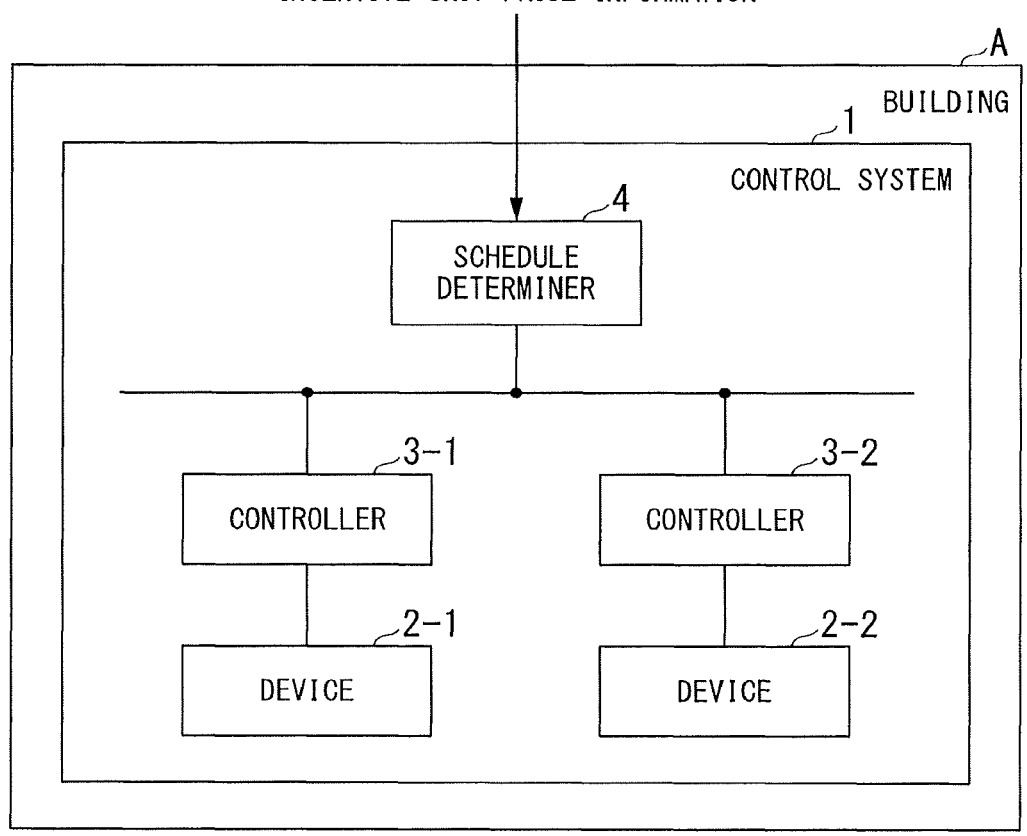
FIG. 1 shows a control system in a first embodiment.

FIG. 1 shows a control system 1 of the first embodiment. The control system 1 has a device 2, a controller 3, and a schedule determination device 4. The control system 1 may have a plurality of devices 2. The control system 1 may have a plurality of controllers 3. The control system 1 may be provided in a building A or in another prescribed location other than the building A. In this control system 1, these functional blocks may be distributed and provided in a prescribed range such as plant equipment.

The schedule determination device 4 acquires index information. The index information represents an index of the operation schedule of the device 2. The operation schedule, for example, may be values that express the time sequence of the operating state (on state and off state) of the device 2, and may be calculated values that express, in time sequence, an output in response to the operation state of the device 2. The index information includes, for example, weather forecast information, baseline information, and incentive unit price information. The index information will be described later.

The schedule determination device 4 optimizes the operation schedule of the device 2, based on the acquired index information. The schedule determination device 4 determines a setting value of the device 2 based on the acquired information. The setting value is, for example a value that represents, in time sequence, the on state and off state of the device 2. The schedule determination device 4 determines the setting value so that the index of the operation schedule of the device 2 satisfies a constraint condition. The schedule determination device 4 outputs information representing the setting value to the controller 3.

The controller 3 acquires the information indicating the setting value responsive to the operation schedule from the schedule determination device 4. The controller 3 determines a control value, based on the acquired setting value. The controller 3 controls the device 2 based on the control value.

Figure 2:
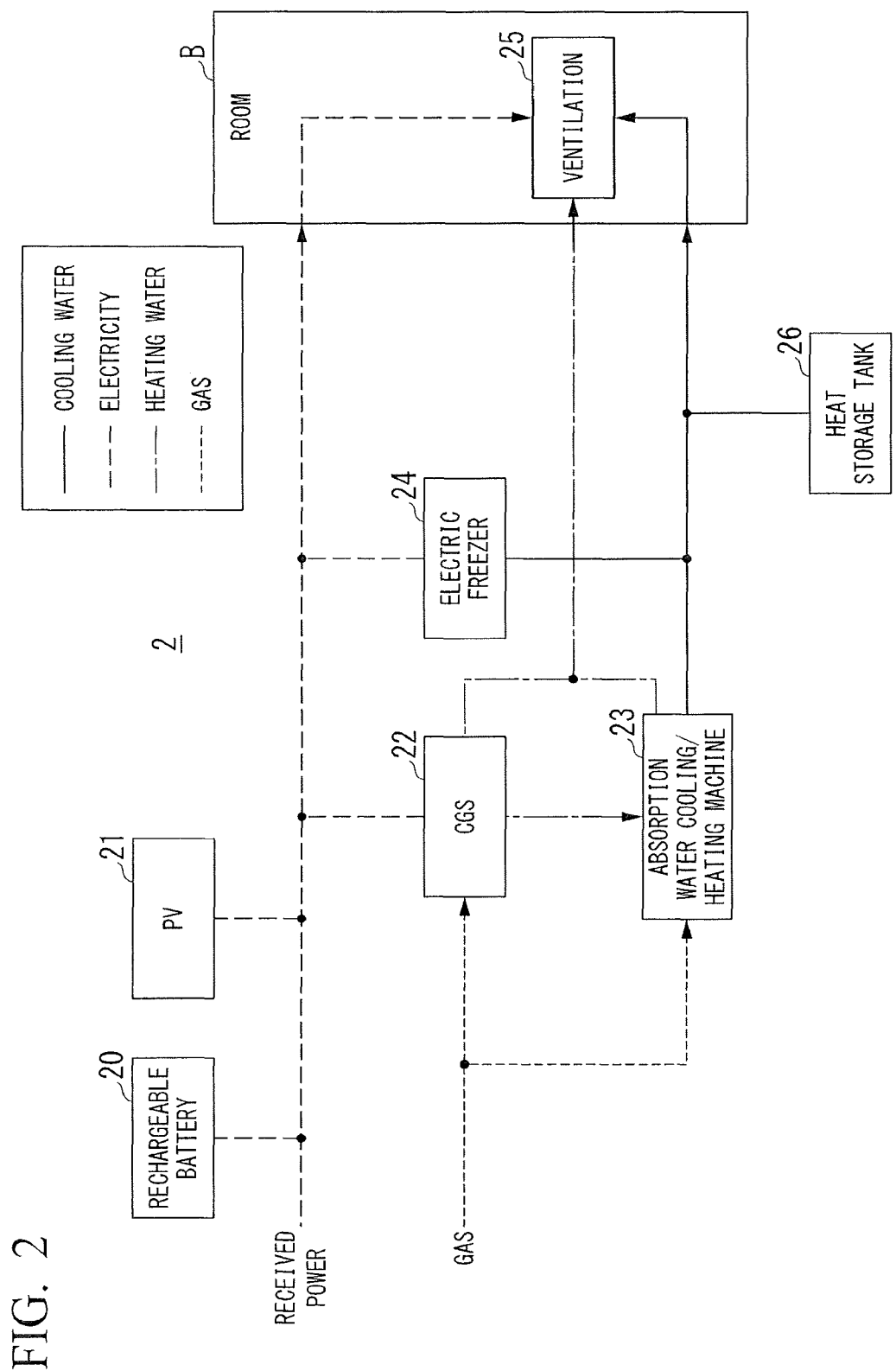
FIG. 2 shows a device in the first embodiment.

FIG. 2 shows the device 2 in the first embodiment. The device 2 executes prescribed operation, based on control by the controller 3. The device 2 supplies electricity, cooling water, or heating water to a ventilation device 25 in the room B as the energy source of received power or gas.

The device 2 is an energy-sourcing device, an energy-consuming device, or an energy-storing device.

An energy-sourcing device supplies energy. An energy-sourcing device is, for example, a PV (photovoltaic) power generation system 21, CGS (co-generation system) 22, an absorption water cooling/heating machine 23, or an electric freezer 24. An energy-consuming device is a heat-sourcing device. The energy-consuming device is, for example, a ventilation device 25. An energy-storing device is a device that store energy. The energy-storing device is, for example, a rechargeable battery 20 or a heat storage tank 26.

The rechargeable battery 20 stores power acquired from a power-receiving system. The rechargeable battery 20 stores power acquired from the photovoltaic power generation system 21. The rechargeable battery 20 stores power acquired from the co-generation system 22. The rechargeable battery 20 supplies power to the electric freezer 24 and the ventilation device 25.

The photovoltaic power generation system 21 supplies electricity generated from solar light to the rechargeable battery 20, the electric freezer 24, and the ventilation device 25.

The co-generation system 22 acquires gas from a gas system. The co-generation system 22 supplies electricity generated by the gas to the rechargeable battery 20. The co-generation system 22 supplies heated water that includes heat from the gas to the absorption water cooling/heating machine 23 and the ventilation device 25.

The absorption water cooling/heating machine 23 acquires gas from the gas system, and acquires heated water from the co-generation system 22. The absorption water cooling/heating machine 23 produces heated water that includes heat by gas or heated water. The absorption water cooling/heating machine 23 supplies heated water to the ventilation device 25. The absorption water cooling/heating machine 23 produces cooling water that includes heat by gas or heated water. The absorption water cooling/heating machine 23 supplies cooling water to the ventilation device 25 and the heat storage tank 26.

The electric freezer 24 acquires electricity from the power-receiving system. The electric freezer 24 produces cooling water that include heated water by electricity. The electric freezer 24 supplies cooling water to the ventilation device 25 and the heat storage tank 26.

The ventilation device 25 acquires electricity from the power-receiving system. The ventilation device 25 acquires electricity from the rechargeable battery 20 and the photovoltaic power generation system 21. The ventilation device 25 adjusts the air in the room B by electricity. The ventilation device 25 acquires heated water from the co-generation system 22. The ventilation device 25 acquires cooling water from the absorption water cooling/heating machine 23 or the heat storage tank 26. The ventilation device 25 executes cooling and heating of the room B by cooling water and heated water.

The heat storage tank 26 acquires cooling water from the absorption water cooling/heating machine 23. The heat storage tank 26 acquires cooling water from the electric freezer 24. The heat storage tank 26 stores heat included in the acquired cooling water. The heat storage tank 26 supplies cooling water that includes stored heat to the ventilation device 25.

Figure 3:
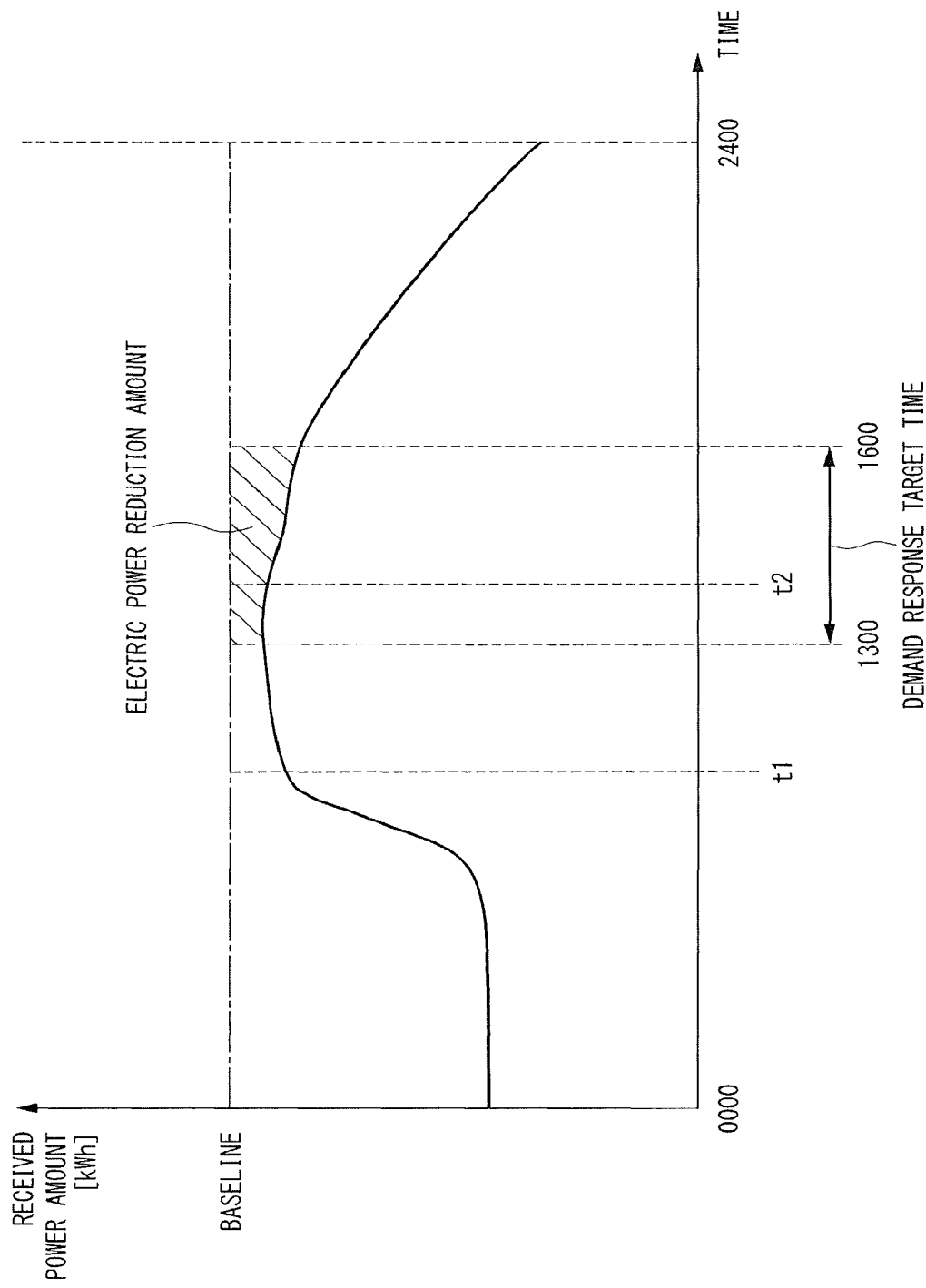
FIG. 3 shows the variation of the received power amount in the first embodiment.

FIG. 3 shows the variation of the received power amount in the first embodiment, in which the horizontal axis represents the time from 0 to 24 hours, and the vertical axis represents the received power amount (kWh) to the device 2. In FIG. 3, as an example, the demand response target time is from 1300 to 1600. In the demand response target time, the electric power reduction amount is the integration of the received power amount below the baseline. The equipment operator (consumer) of the device 2 receives as an incentive an amount that is this electric power reduction amount multiplied by an incentive unit price. If there is an upper limit established for the incentive, if the electric power reduction amount exceeds a target amount during the demand response target time, the equipment operator of the device 2 may receive as an incentive a fixed amount established for each target amount.

In FIG. 3, time t1 is not within the demand response target time. For that reason, even if the received power amount at time t1 is below the baseline, the equipment operator of the device 2 cannot receive an incentive. In contrast, time t2 is within the demand response target time. For that reason, if the received power amount at time t2 is below the baseline, the equipment operator of the device 2 can received an incentive.

Next, an example of the constitution of the schedule determination device 4 will be described.

Figure 4:
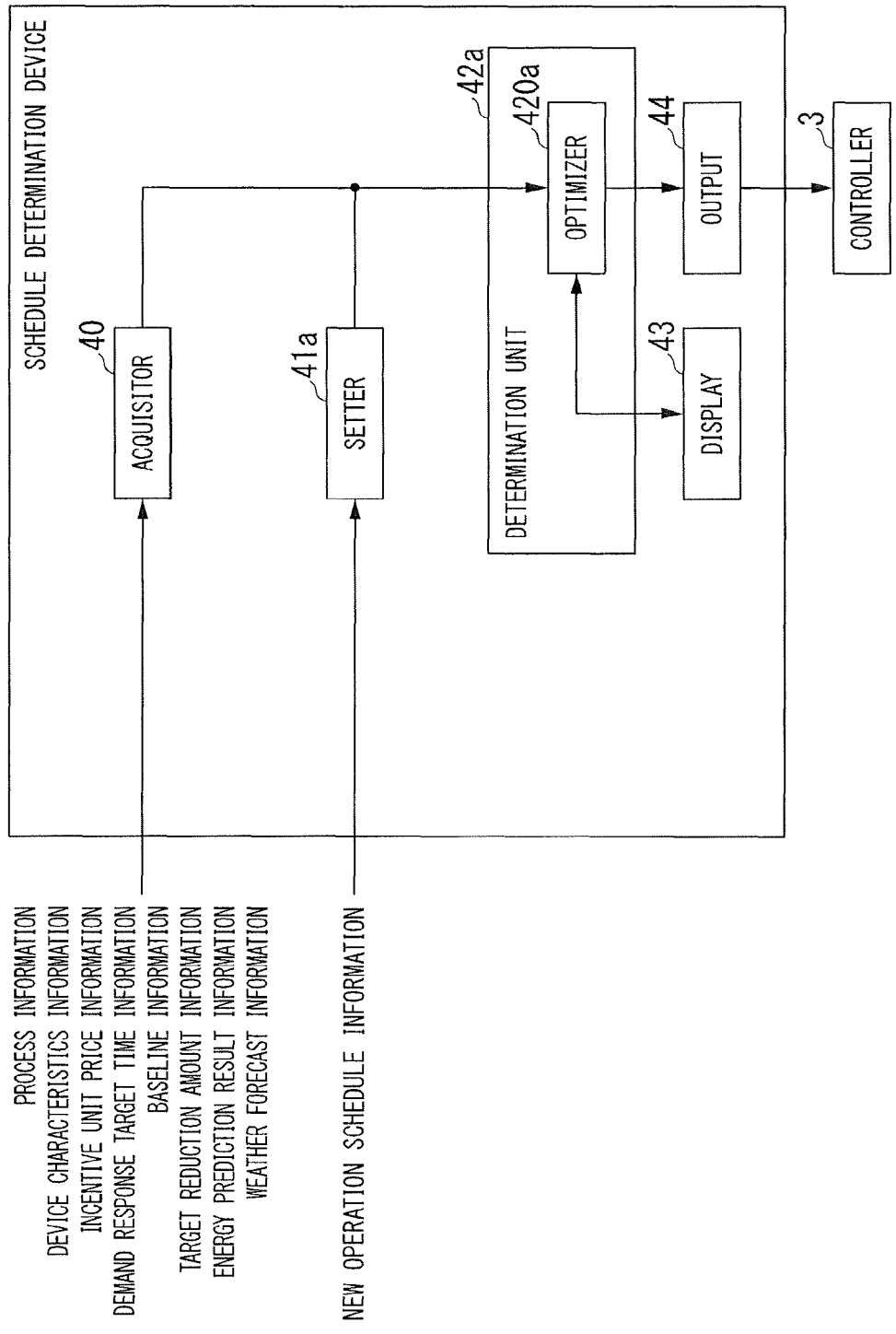
FIG. 4 shows a schedule determination device of the first embodiment.

FIG. 4 shows the schedule determination device 4 of the first embodiment (hereinafter called the "schedule determination device 4a"). The schedule determination device 4a has an acquisitor 40, a setter 41a, a determiner 42a, a display 43, and output 44. The determiner 42a has an optimizer 420a.

A part or all of the acquisitor 40, the setter 41a, and the determiner 42a is a software functional unit that functions by a processor such as a CPU (central processing unit) executing a program stored in memory. A part or all of the functional units may be a hardware functional unit such as an LSI (large-scale integration) device or an ASIC (application-specific integrated circuit).

The acquisitor 40, the setter 41a, and the determiner 42a may have a volatile memory such as a RAM (random-access memory) or a register. The acquisitor 40, the setter 41a, and the determiner 42a may have a non-volatile memory (non-temporary recording medium) such as a ROM (read-only memory), a flash memory, or a hard-disk drive. The non-volatile memory stores a program for the purpose of operating a processor such as a CPU.

The acquisitor 40 acquires a demand response signal. The demand response signal includes, for example, various information used in the optimization processing for the optimizer 420a, and index information. The index information indicates the index (target function) of the operation schedule of the device 2. The index information is, for example, process information, device characteristics information, incentive unit price information, demand response target time information (power suppression target time information), baseline information, target reduction amount information, energy prediction result information, and weather forecast information.

Process information is process data indicating remaining stored power amount, remaining stored heat amount, and the like. Device characteristics information indicates the characteristics (performance) of the device 2. Incentive unit price information indicates the incentive unit price of a demand response. Demand response target time information indicates the time established as the target for a demand response. Baseline information indicates the demand response baseline. The baseline is, for example, established based on the device 2 received power amount and the like in a past demand response target time. The baseline is established, for example, based on the maximum value of the receive power amount of the device 2 during demand response target times over the past one month.

Target reduction amount information indicates the target value of the reduction amount of the received power. Energy prediction result information indicates the result of predicting the demand for energy such as received power. Weather forecast information indicates the weather forecast for the area surrounding the building A.

The acquisitor 40 acquires information indicating and index constraint condition. The constraint condition, for example, is expressed by an equation that includes variables (parameters) that establish the index constraint condition.

FIG. 5 shows the variables in the first embodiment. In the following, with regard to the operation schedule before a change, the range with settings of variable values that establish the index constraint condition will be called the first range. The variable X1 is received power amount (kWh). The first range (upper and lower limit values) in which the variable X1 is set is $0 \leq X1 \leq$ contracted power. The variable X2 is the absorption water cooling/heating machine load ratio (exhausted heat intake mode). The first range in which the variable X2 is set is (lower limit)$\leq X2 \leq 1$. The lower limit is the lower limit load ratio established in accordance with the performance of the device 2. The variable X3 is the absorption water cooling/heating machine load ratio (production of cooling water, using gas). The first range in which the variable X3 is set is (lower limit)$\leq X3 \leq 1$. The variable X4 is the absorption water cooling/heating machine load ratio (production of heated water, using gas). The first range in which the variable X4 is set is (lower limit)$\leq X4 \leq 1$.

The variable X5 is the electric freezer load ratio. The first range in which the variable X5 is set is (lower limit)$\leq X5 \leq 1$. The variable X6 is the co-generation system load ratio. The first range in which the variable X6 is set is (lower limit)$\leq X6 \leq 1$. The variable X7 is the remaining stored heat amount (kWh). The first range in which the variable X7 is set is $0 \leq X7 \leq$ (heat storage capacity). The variable X8 is the SOC (state of charge; remaining stored charge) (kWh). The first range in which the variable X8 is set is $0 \leq X8 \leq$ (rechargeable battery capacity).

The setter 41a acquires information indicating the first range. The setter 41a also acquires information indicating a new operation schedule. The new operation schedule may include content for which the equipment operator has given an instruction for changing.

FIG. 6 shows a new operation schedule in the first embodiment.

Between 6 o'clock and 7 o'clock, as one example, the variable X1 is none, the variable X2 is ON, the variable X3 is ON, the variable X4 is OFF, and the variable X5 is OFF.

The variable X6 is OFF, the variable X7 is none, and the variable X8 is none. Between 7 o'clock and 8 o'clock, as one example, the variable X1 is none, the variable X2 is ON, the variable X3 is ON, the variable X4 is OFF, and the variable X5 is OFF.

The variable X6 is OFF, the variable X7 is none, and the variable X8 is none.

Between 8 o'clock and 9 o'clock, as one example, the variable X1 is none, the variable X2 is ON, the variable X3 is ON, the variable X4 is OFF, and the variable X5 is OFF.

The variable X6 is OFF, the variable X7 is none, and the variable X8 is none.

Of the operation schedule for the period from 8 o'clock to 9 o'clock, as one example, the variables X2 to X6 are variables that are manually changed by the equipment operator of the device 2.

Between 9 o'clock and 10 o'clock, as one example, the variable X1 is none, the variable X2 is ON, the variable X3 is ON, the variable X4 is OFF, and the variable X5 is OFF.

The variable X6 is OFF, the variable X7 is none, and the variable X8 is none.

Between 8 o'clock and 9 o'clock, the constraint condition equation of the variable X2 is expressed by Equation (1).

$$\text{(Lower limit load ratio established by the device performance)} \leq X2 \leq 1 \quad (1)$$

Between 8 o'clock and 9 o'clock, the constraint condition equation of the variable X3 is expressed by Equation (2).

$$\text{(Lower limit load ratio established by the device performance)} \leq X3 \leq 1 \quad (2)$$

Between 8 o'clock and 9 o'clock, because, as shown in FIG. 6, the variable X4 is OFF, the constraint condition equation of the variable X4 OFF is expressed by Equation (3).

$$0 \leq X4 \leq 0 \quad (3)$$

Between 8 o'clock and 9 o'clock, because, as shown in FIG. 6, the variable X5 is OFF, the constraint condition equation of the variable X5 OFF is expressed by Equation (4).

$$0 \leq X5 \leq 0 \quad (4)$$

Between 8 o'clock and 9 o'clock, the constraint condition equation of the variable X5 is expressed by Equation (5).

$$\text{(Lower limit load ratio established by the device performance)} \leq X6 \leq 1 \quad (5)$$

The index (target function), as an example, is expressed by Equation (6). In the following, the subscript t indicates time.

$$\sum_{t=1}^{24} [X1^t \cdot E_C^t + GAS^t \cdot GAS_C] \Rightarrow \min \quad (6)$$

$E_c$ is the power coefficient, and $GAS_c$ is the gas coefficient. The power coefficient and the gas coefficient differ, depending upon index that is minimized. For example, if the index that is minimized is the cost, the power coefficient is the power unit price. The gas coefficient is the gas unit price. Also, for example, if the index that is minimized is the amount of carbon dioxide, the coefficient is emission coefficient of carbon dioxide. Minimization is indicated by min.

The setter 41a establishes the constraint condition of a variable used in the optimization processing, based on the new operation schedule. Examples of constraint condition equations are given as Equation (7) through Equation (14). The constraint condition equations may be changed in accordance with the plant configuration, including the device 2, and in accordance with the type of demand response contract.

$$X1^t + E_{CGS} \cdot X6^t + E_{PV} + (X8^t - X8^{t+1}) = \frac{H_R}{COP_R} \cdot X5^t + E_{DEMAND}^t \quad (7)$$

$$GAS^t = GAS_{CGS} \cdot X6^t + GAS_{ABR\text{-}CG} \cdot X3^t + GAS_{ABR\text{-}HG} \cdot X4^t \quad (8)$$

$$H_{ABR\text{-}CH} \cdot X2^t + H_{ABR\text{-}CG} \cdot X3^t + H_R \cdot X5^t (X7^t - X7^{t+1}) = HC_{DEMAND}^t \quad (9)$$

$$H_{CGS} \cdot X6^t + H_{ABR\text{-}HG} \cdot X4^t > H_{ABR\text{-}IN} \cdot X2^t + HH_{DEMAND}^t \quad (10)$$

$$|X7^t - X7^{t+1}| \le FL_{Hs} \quad (11)$$

$$|X8^t - X8^{t+1}| \le FL_{Bat} \quad (12)$$

$$E_C^t = E_{CHG}^t + INC^t \quad (13)$$

$$X1^t \le \text{Baseline}^t \quad (14)$$

The $E_{CGS}$ shown in the equation (7) represents the co-generation system rated generation amount. The $E_{PV}$ represents the predicted photovoltaic generation amount. The $H_R$ represents the rated cooling amount of the electric freezer. The $COP_R$ represents the coefficient of performance of the electric freezer. The $E_{DEMAND}$ represents the predicted consumed power energy.

The GAS shown in Equation (8) represents the amount of gas used. The $GAS_{CGS}$ represents the rated co-generation system gas use amount. $GAS_{ABR-CG}$ represents the rated gas use amount of the absorption water cooling/heating machine (when producing cooling water). $GAS_{ABR-HG}$ represents the rated gas use amount of the absorption water cooling/heating machine (when producing heated water).

The $H_{ABR-CH}$ shown in Equation (9) represents the rated cooling amount of the absorption water cooling/heating machine (intake of exhausted heat). $H_{ABR-CG}$ represents the rated cooling amount of the absorption water cooling/heating machine (production of cooling water, using gas). $HC_{DEMAND}$ represents the predicted cooling heat consumed energy.

The $H_{ABR-HG}$ shown in Equation (10) represents the rated heating amount of the absorption water cooling/heating machine (production of heated water, using gas). $H_{ABR-IN}$ represents the rated exhausted heat intake amount of the absorption water cooling/heating machine. $HH_{DEMAND}$ represents the predicted heating consumed energy.

The $FL_H$ shown in Equation (11) represents the maximum storage (released) heat amount of the heat storage tank.

The $FL_{Bat}$ shown in Equation (12) represents the maximum charging (discharging) amount of the rechargeable battery.

The $E_{CHG}^t$ [JPY/kWh] shown in Equation (13) represents the unit price of the metered power fee at time t. The $INC^t$ [JPY/kWh] represents the incentive unit price at time t.

The Baseline shown in Equation (14) represents the baseline of the received power amount in the demand response target time. That is, Equation (14) is the condition equation that constrains the received power amount falling below the baseline.

The setter 41a sets a second range that is narrower than the first range, so that the operation schedule actually executed by the device 2 does not exceed a new operation schedule adjusted manually by the equipment operator.

The optimizer 420a establishes an operation schedule of the device 2, using values of variables that are within the second range, so that indexes of the new operation schedule satisfy the constraint conditions. For example, the optimizer 420a optimizes the operation schedule of the device 2, based on the indexes of the operation schedule of the device 2. For example, the optimizer 420a optimizes the operation schedule of the device 2 so as to minimize the values of indexes (target functions) such as consumption energy and energy cost.

The optimizer 420a establishes values of variables that optimize the indexes (minimize the target functions), while satisfying the constraint conditions, using an optimization problem solving algorithm, such as mathematical programming or iterated calculations by simulation. The optimizer 420a causes the display 43 to display information indicating the established operation schedule.

The equipment operator of the device 2 can verify the operation schedule displayed on the display 43. If there is no problem or something that requires correction in the operation schedule of the device 2, the equipment operator of the device 2 can output to the determiner 42a information indicating approval, via the display 43, by making an operation of pressing an operating key displayed on a touch panel of the display screen of the display 43. If acquisition is made of information indicating approval, the optimizer 420a outputs to the output 44 information indicating setting values in accordance with the established operation schedule.

The display 43 is a display device. The display 43 displays a screen that shows an operation schedule established by the determiner 42a. The display 43 may have a touch panel on a display screen. The touch panel detects operations made with respect to operating keys displayed on the display screen.

If the operation of an operating key is detected, the display 43 outputs to the determiner 42c a signal responsive to that operation.

The output 44 outputs to the controller 3 information indicating setting values in accordance with the operation schedule established by the determiner 42a.

Figure 7:
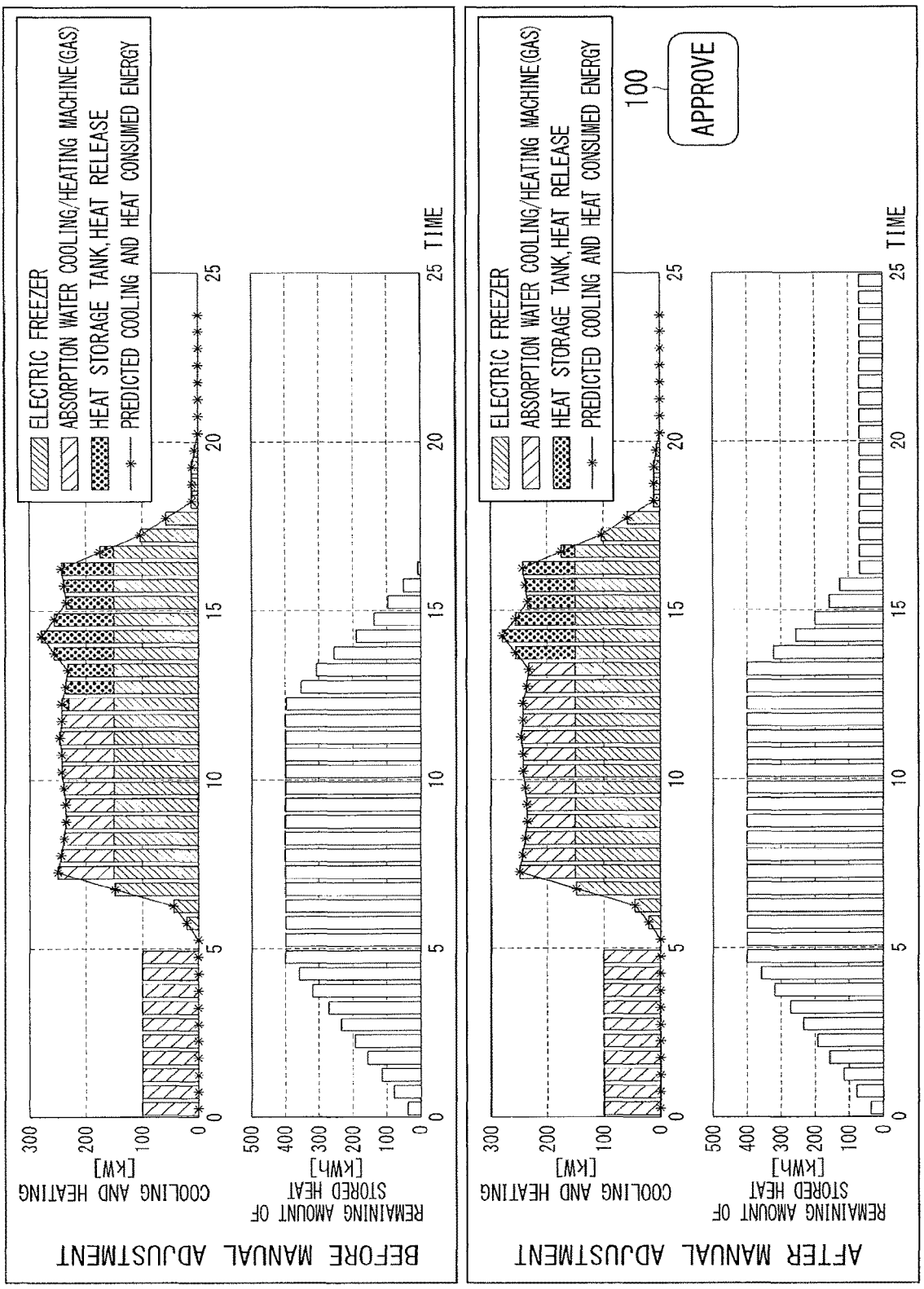
FIG. 7 shows a display of an operation schedule in the first embodiment.

FIG. 7 shows a display of an operation schedule in the first embodiment. The image representing the operation schedule is displayed on the display screen of the display 43. In the graphs of FIG. 7, the first vertical axis represent the cooling and heating, and the second vertical axis represents the remaining amount of stored heat. The horizontal axes represent time. The upper part of FIG. 7 is an image representing the operation schedule of the device 2 before a change by the equipment operator of the device 2. The lower part of FIG. 7 is an image representing the operation schedule of the device 2 after the equipment operator of the device 2 made a change (manual adjustment).

The operating key 100 displayed with the character string "Approve" is displayed on the display screen of the display 43. The operating key 100 is for the purpose of outputting information indicating approval to the optimizer 420a.

The operation schedule of the device 2 before the change (displayed as "Before manual adjustment" in FIG. 7) and the new operation schedule of the device 2 (displayed as "After manual adjustment" in FIG. 7) are displayed on a single display screen. This enables a quantitative grasp of how the operation schedule of the device 2 or the state of a plant will change in response to the new operation schedule. The equipment operator of the device 2 can easily grasp how the operation schedule of the device 2 or the state of a plant will change in response to the new operation schedule.

Figure 8:
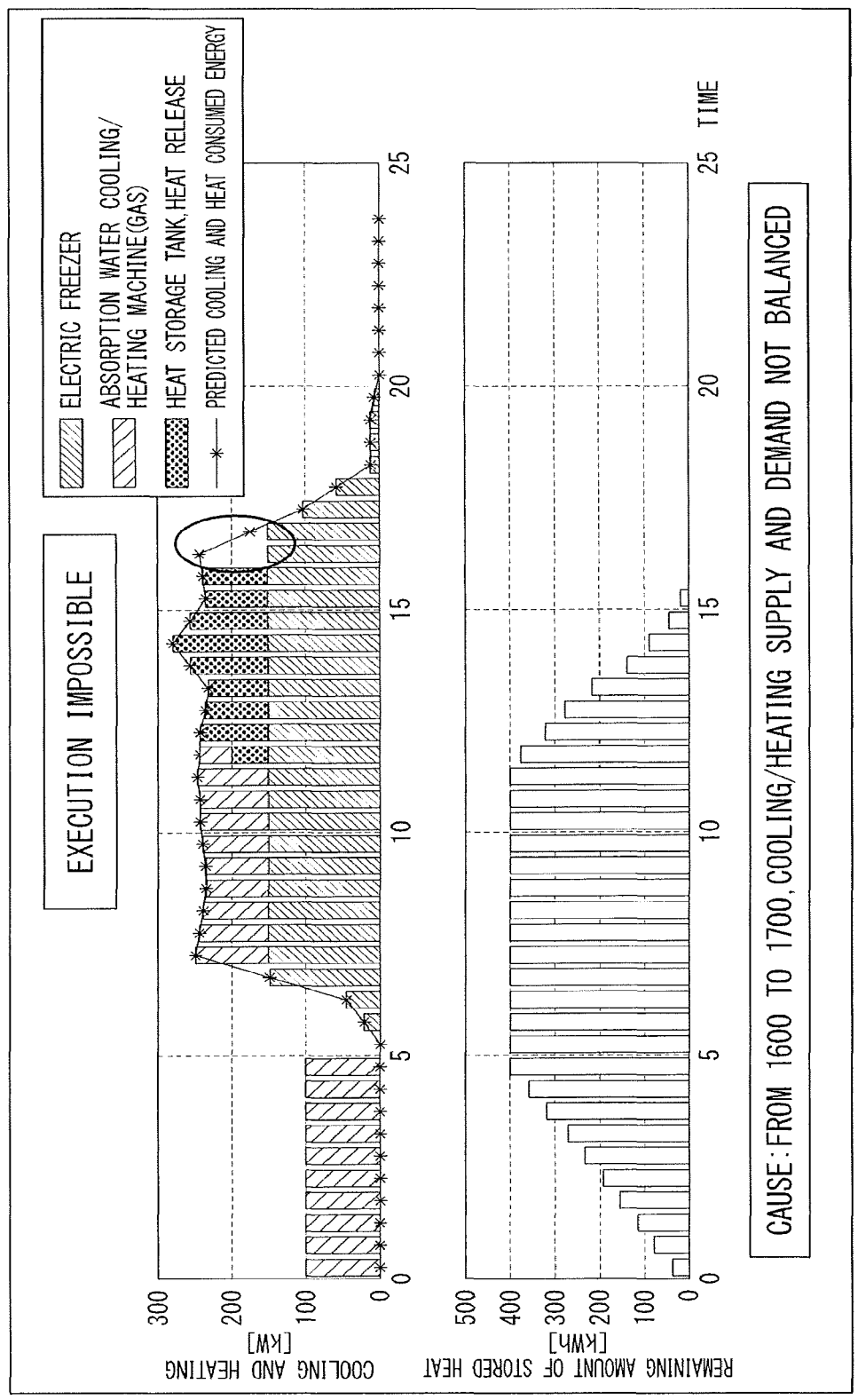
FIG. 8 shows a display of a new operation schedule in the first embodiment.

FIG. 8 shows a display of a new operation schedule in the first embodiment. In the graphs of FIG. 8, the first vertical axis represents cooling and heating, and the second vertical axis represents the remaining amount of stored heat. The horizontal axes represent time. There are cases in which the optimizer 420a cannot obtain a solution satisfying the constraint condition using an optimization algorithm. For example, if the second range (variable upper and lower limits) or device 2 constraint conditions such as Equation (7) or Equation (14) are not satisfied, execution of a new operation schedule is impossible. In such a case, the display 43 displays an image representing that it is impossible to execute the new operation schedule. In FIG. 8, the display 43 displays the character string "Execution impossible". In FIG. 8, the display 43 displays that the cooling/heating supply and demand balance represented by Equation (9) and the constraint condition from 1600 to 1700 are not satisfied by the new operation schedule. In FIG. 8, the display 43 is displaying the character string "Cause: From 1600 to 1700, cooling/heating supply and demand is not balanced".

Figure 9:
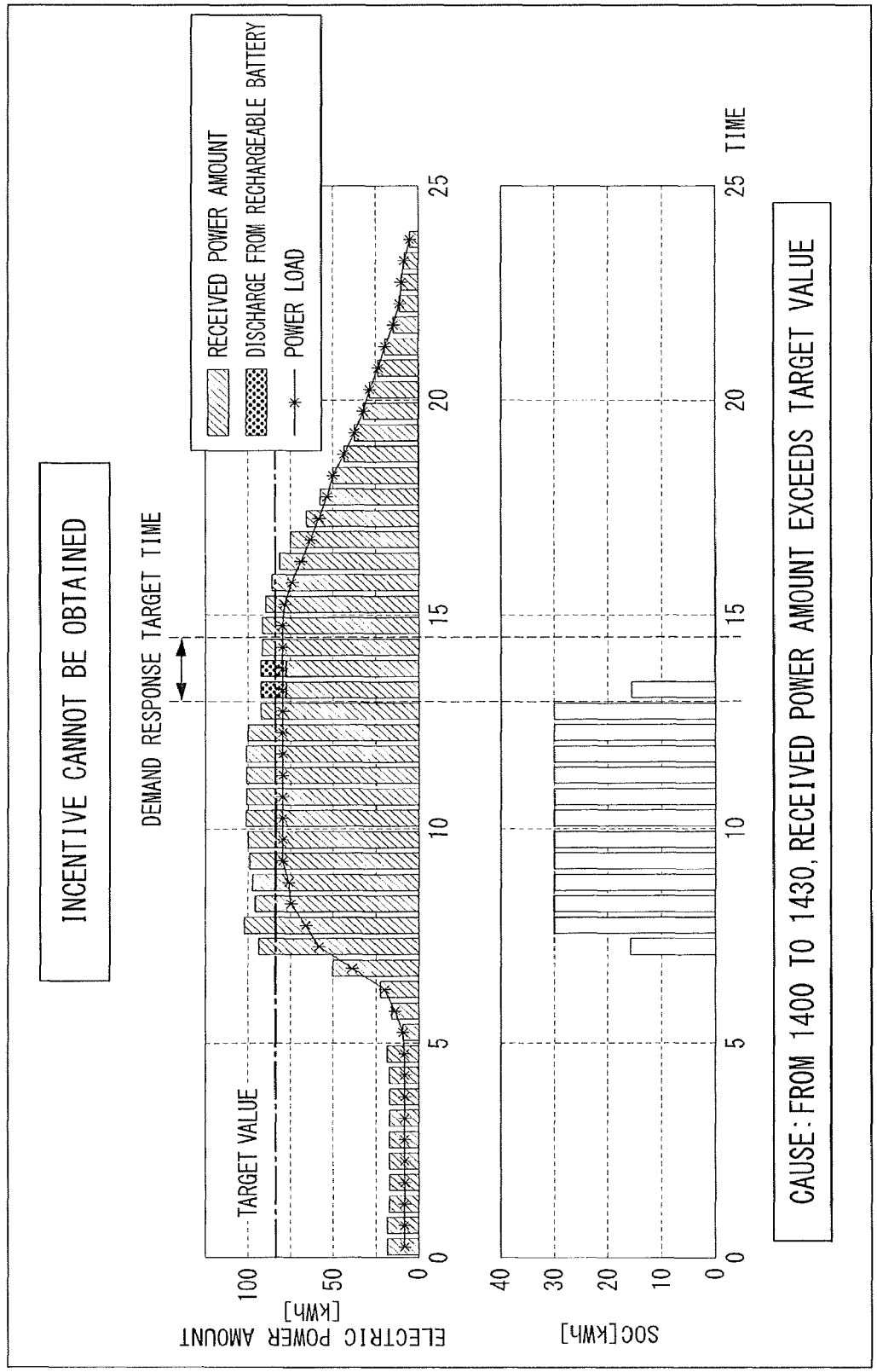
FIG. 9 shows the display of a message in the first embodiment.

FIG. 9 shows a display of a message in the first embodiment. In the graphs of FIG. 9, the first vertical axis represents electric power amount, and the second vertical axis represents the SOC (state of charge; remaining battery charge). The horizontal axes represent time. If the received power amount exceeds the target value in the demand response target time, the planned incentive cannot be obtained. In this case, the display 43 makes notification to the effect that an incentive cannot be obtained. In FIG. 9, the display 43 is displaying the character string "Incentive cannot be obtained". In FIG. 9, the display 43 is making notification to the effect that the new operation schedule received power amount exceeds the target value from 1400 to 1430. In FIG. 9, the display 43 is displaying the character string "Cause: From 1400 to 1430, received power amount exceeds target value".

Figure 10:
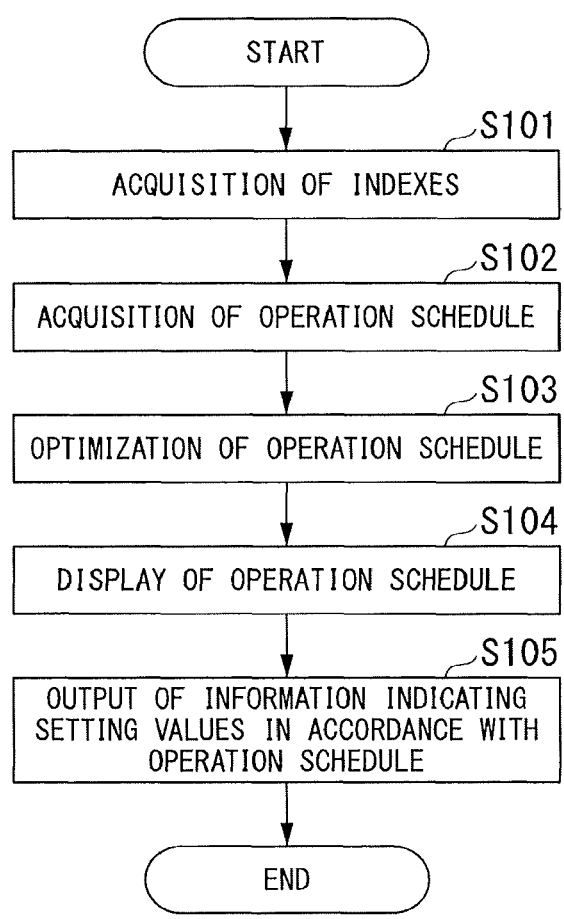
FIG. 10 shows the operation of a schedule determination device of the first embodiment.

FIG. 10 shows the operation of the schedule determination device 4 of the first embodiment. The schedule determination device 4 executes the operation shown in FIG. 10 if the equipment operator of the device 2 changes the operation schedule.

The acquisitor 40 acquires index information (step S101).

The setter 41a acquires information indicating the new operation schedule (step S102).

The optimizer 420 optimizes the operation schedule of the device 2, based on the indexes of the operation schedule of the device 2 (step S103).

The display 43 displays an image representing the operation schedule determined by the determiner 42a (step S104).

The output 44 outputs to the controller 3 information indicating the setting values in accordance with the operation schedule determined by the determiner 42a (step S105).

As noted above, the schedule determination device 4a of the first embodiment has an acquisitor 40, a setter 41a, and a determiner 42a. The acquisitor 40 acquires indexes (target functions) of an operation schedule of the device 2 and constraint conditions of the indexes. The setter 41a sets a second range (upper and lower limit values) that is narrower than the first range set in the operation schedule before a change as the range for the values of variables that establish constraint conditions of indexes of a new operation schedule. The determiner 42a establishes an operation schedule of the device 2, using the variable values within the second range.

By this constitution, the setter 41a sets a second range that is narrower than the first range set in the operation schedule before a change as the range for the values of variables that establish constraint conditions of the indexes of a new operation schedule. This enables the schedule determination device 4a and the schedule determination program of the first embodiment to properly establish an operation schedule.

The equipment operator of the device 2 can obtain from the schedule determination device 4a an operation schedule of the device 2 that reflects a manual adjustment. The equipment operator of the device 2 can operate the device 2 with efficiency and stability, in accordance with the situation. The equipment operator of the device 2 can obtain an incentives in accordance with a demand response.

The determiner 42a of the first embodiment causes the display by the display 43 of a graph representing the operation schedule before a change and a graph of a new operation schedule.

By doing this, the schedule determination device 4a and the schedule determination program of the first embodiment enable an accurate grasp of behavior such as received power amount, even if the equipment operator of the device 2 has made an arbitrary manual adjustment of the operation schedule of the device 2 in accordance with the situation.

Second Embodiment

In the second embodiment, the detection of the location of a change with respect to an operation schedule before a change is a point of difference with respect to the first embodiment. In the second embodiment, only the point of difference with respect to the first embodiment will be described.

Figure 11:
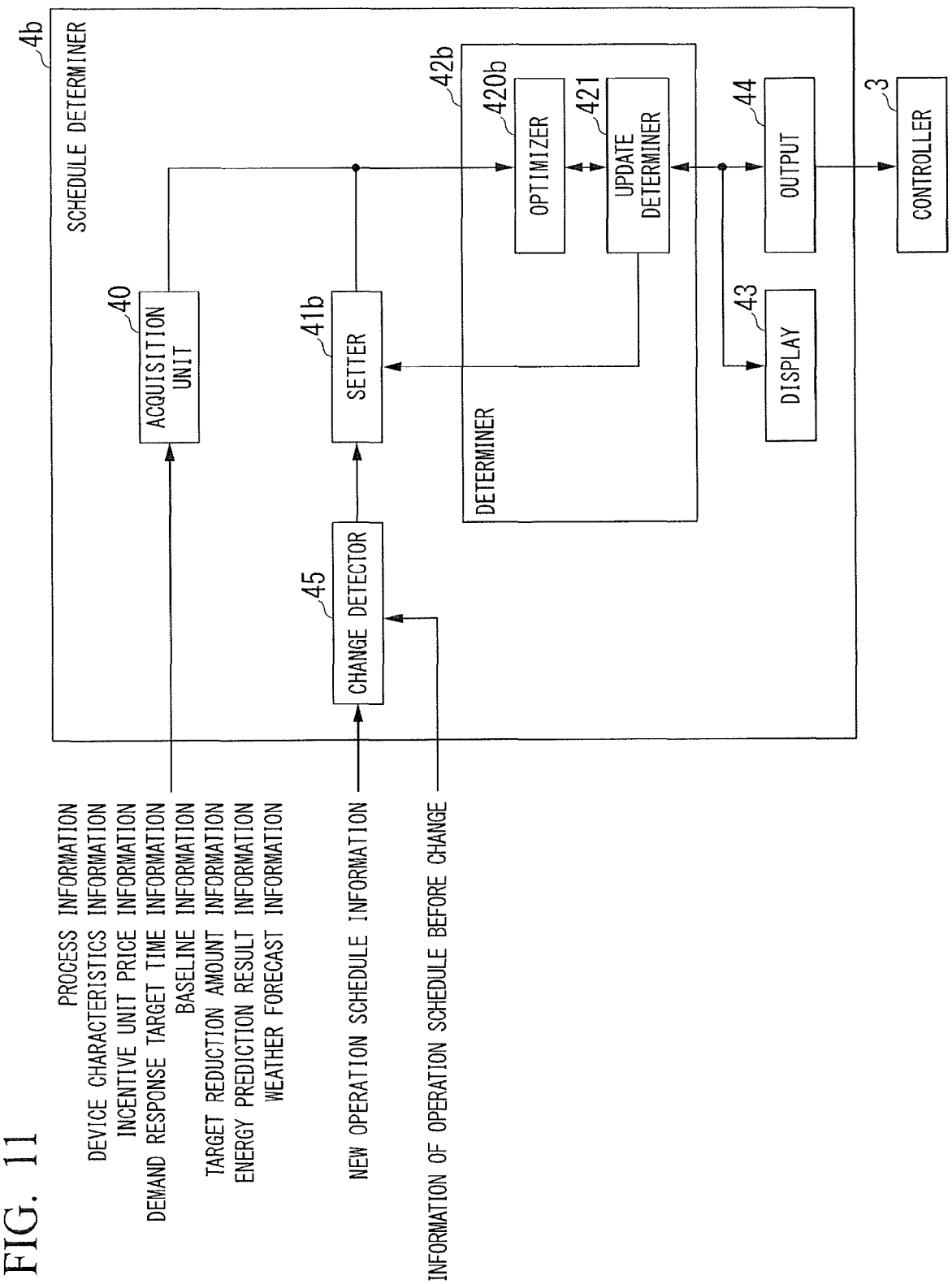
FIG. 11 shows a schedule determination device of a second embodiment.

FIG. 11 shows a schedule determination device 4 of the second embodiment (hereinafter called the "schedule determination device 4b"). The schedule determination device 4b has an acquisitor 40, a setter 41b, a determiner 42b, a display 43, an output 44, and a change detector 45. The determiner 42b has an optimizer 420b and an update determiner 421.

A part or all of the acquisitor 40, the setter 41b, the determiner 42b, and the change detector 45 is a software functional unit that functions by a processor such as a CPU executing a program stored in memory. A part or all of these may be a hardware functional unit such as an LSI device or an ASIC circuit.

The acquisitor 40, the setter 41b, the determiner 42b, and the change detector 45 have a volatile memory such as a RAM or a register. The acquisitor 40, the setter 41b, the determiner 42b, and the change detector 45 may have a non-volatile memory (non-temporary recording medium) such as a ROM, a flash memory, a hard-disk drive, or a register. The non-volatile memory stores a program for the purpose of operating a processor such as a CPU.

The change detector 45 acquires information indicating an operation schedule before a change and information indicating a new operation schedule. The change detector 45, regarding the time established for determination of a schedule, compares the operation schedule before the change with the new operation schedule. The change detector 45 detects a location that differs between the new operation schedule and the operation schedule before a change as a location that is to be changed with respect to the operation schedule before the change. This location to be changed is, for example, a location at which the equipment operator of the device 2 has given an instruction to change. The location to be changed, for example, may be determined based on a condition that is established by the change detector 45 beforehand.

FIG. 12 shows an operation schedule before a change in the second embodiment, and FIG. 13 shows a new operation schedule in the second embodiment.

In FIG. 12, the variable X3 is OFF between 6 o'clock and 9 o'clock. In FTG. 13 the variable X3 is ON between 6 o'clock and 9 o'clock. The change detector 45 detects that the points to be changed is the variable X3 between 6 o'clock and 9 o'clock.

The setter 41b sets a second range that is narrower than the first range (upper and lower limit values) as the range for variable values corresponding to change points. A variable corresponding to a change location is a variable for which the operation schedule can be changed regarding a part of an operation schedule for which a change has been instructed. The setter 41b need not set a second range narrower than the first range as the range for variable values corresponding to points that are not changed.

If a trigger signal has been acquired from the update determiner 421, the setter 41b sets a third range wider than the second range (upper and lower limit values) as the range of variable values corresponding to points to be changed.

That is, with regard to points to be changed, the setter 41b cancels the second range established for the variable values that establish the constraint conditions. By doing this, the setter 41b relaxes the constraint conditions regarding points to be changed. For example, the setter 41b changes Equation (3) to be Equation (15), so as to relax the constraint conditions for points to be changed.

(Lower limit load ratio established by the device performance)≤$X4$≤1   (15)

The optimizer 420b uses the values of variables within the second range to establish the operation schedule of the device 2. If a third range is established regarding points to be changed, the optimizer 420b uses the variable values within the third range corresponding to points to be changed to establish the operation schedule of the device 2. The optimizer 420b outputs information indicating the setting values in accordance with the operation schedule to the update determiner 421.

The update determiner 421 determines whether or not to adjust the operation schedule. In this determination processing, the update determiner 421 determines whether or not to update variables (parameters), based on the setting values in accordance with the operation schedule. The update determiner 421 determines whether or not to update variables, based on whether or not the operation schedule satisfies the constraint condition equations such as Equation (7) or Equation (14). The update determiner 421 may determine whether or not to update variables, based on the value returned by a function in, for example, a optimization algorithm calculation.

If the indexes of the operation schedule established by the optimizer 420b satisfy the constraint conditions, the update determiner 421 makes the determination not to update the variables. If execution of the operation schedule established by the optimizer 420b is impossible, the update determiner 421 makes the determination to update the variables, in which case it outputs a trigger signal. The update determiner 421 repeats the determination processing until a solution in which the indexes satisfy the constraint conditions is obtained.

The display 43 displays an operation schedule of the device 2 established by the determiner 42b.

Figure 14:
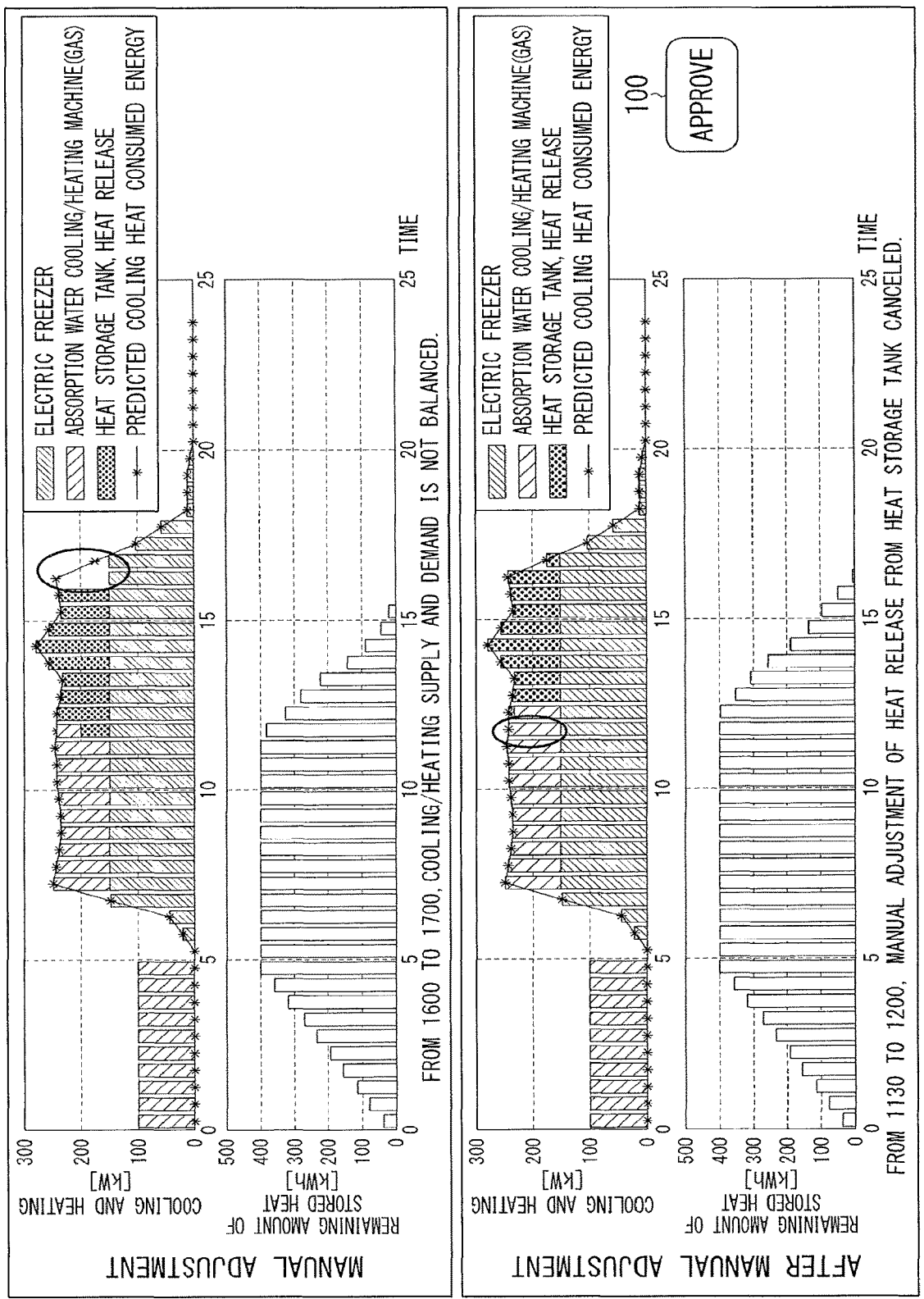
FIG. 14 shows the display of an operation schedule with relaxed constraint conditions in the second embodiment.

FIG. 14 shows the display of an operation schedule with relaxed constraint conditions in the second embodiment. In the graphs of FIG. 14, the first vertical axis represents cooling and heating, and the second vertical axis represents the remaining amount of stored heat. The horizontal axes represent time. The display 43 displays an operation schedule of the device 2 established by the determiner 42b. The upper part of FIG. 14 is an image representing an operation schedule of the device 2 after the equipment operator of the device 2 made a change (manual adjustment). The operation schedule of the device 2 after the change made by the equipment operator of the device 2 has an overlaid image of points in which the operation schedule cannot be executed indicated by enclosure in an ellipse. The lower part of FIG. 14 is an image representing the operation schedule of the device 2 after relaxation of the constraint conditions (readjustment). The operation schedule of the device 2 after the relaxation of the constraint conditions has an overlaid image of points in which the constraint conditions have been relaxed by the setter 41 indicated by enclosure in an ellipse. The operating key 100 is displayed on the display screen of the display 43. Upon acquisition of information indicating approval, the optimizer 420b outputs to the output 44 information indicating the setting values in accordance with the established operation schedule.

Figure 15:
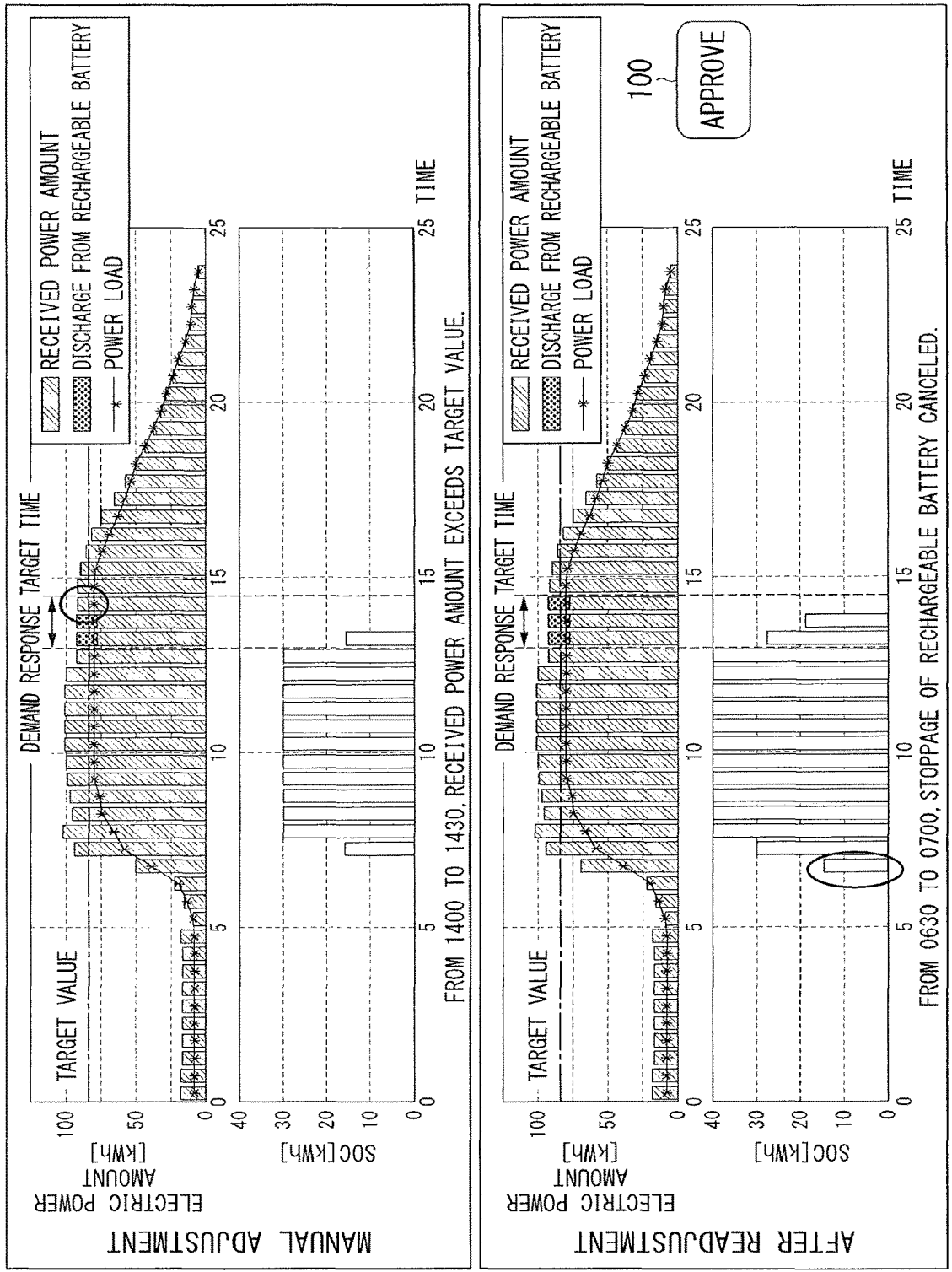
FIG. 15 shows the display of an operation schedule with a relaxed constraint condition when the received power amount exceeds a target value in the second embodiment.

FIG. 15 shows the display of an operation schedule in which the constraint conditions have been relaxed when the received power amount exceeds the target value in the second embodiment. In the graphs of FIG. 15, the first vertical axis represents the power amount, and the second vertical axis represents the SOC (remaining stored charge). The horizontal axes represent time. The upper part of FIG. 15 shows, for the case in which the received power amount in the new operation schedule of the device 2 exceeds the target value for the demand response target time, an image of the new operation schedule of the device 2. The operation schedule of the device 2 after changing by the equipment operator of the device 2 has overlaid an image of points in which the operation schedule cannot be executed are indicated by enclosure in an ellipse, and an image indicating a target value such as a baseline. The lower part of FIG. 15 is an image indicating the operation schedule of the device 2 after relaxation (readjustment) of the constraint conditions. The operation schedule of the device 2 after relaxation of the constraint conditions has overlaid image of points in which the constraint conditions have been relaxed by the setter 41b, indicated by enclosure in an ellipse. The operating key 100 is displayed on the display screen of the display 43. Upon acquisition of information indicating approval, the optimizer 420b outputs to the output 44 information indicating the setting values in accordance with the established operation schedule.

Figure 16:
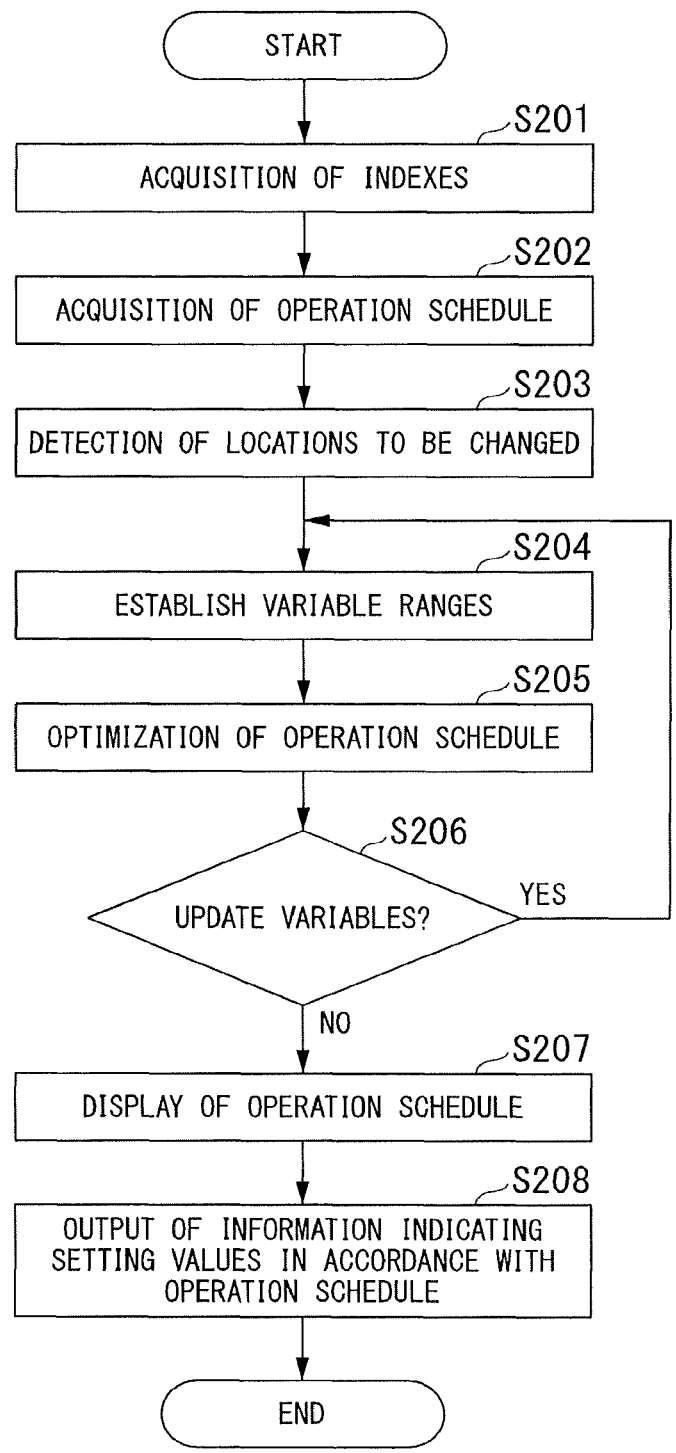
FIG. 16 shows the operation of a schedule determination device of the second embodiment.

FIG. 16 shows the operation of the schedule determination device 4b of the second embodiment. The schedule determination device 4b executes the operation shown in FIG. 16 if the equipment operator of the device 2 changes the operation schedule.

The acquisitor 40 acquires index information (step S201). The change detector 45 acquires information indicating the operation schedule before the change and information indicating a new operation schedule (step S202).

The change detector 45 detects a location at which the operation schedule before the change is to be changed. The setter 41b acquires information indicating the operation schedule before the change and information indicating the new operation schedule (step S203).

The setter 41b acquires information indicating an operation schedule before a change and information indicating a new operation schedule. The setter 41b sets a second range narrower than the first range (upper and lower limit values) as the range for variable values corresponding to points to be changed. If a trigger signal has been acquired from the update determiner 421, the setter 41b sets a third range wider than the second range (upper and lower limit values) as the range of variable values corresponding to points to be changed. This is, with regard to points to be changed, the setter 41b cancels the second range established for the variable values that establish the constraint conditions (step S204).

The optimizer 420b optimizes the operation schedule of the device 2, based on the indexes of the operation schedule of the device 2. The optimizer 420b outputs to the update determiner 421 information indicating setting values in accordance with operation schedule (step S205).

The update determiner 421, based on the setting values in accordance with the operation schedule, determines whether or not to update variables (parameters) (step S206). If the variables are to be updated (YES at step S206), the update determiner 421 returns to the processing of step S204). If, however, updating is not to be done (NO at step S206), the update determiner 421 returns to the processing of step S204.

The display 43 displays an image representing the operation schedule established by the determiner 42b (step S207).

The output 44 outputs to the controller 3 information indicating the setting values in accordance with the operation schedule established by the setter 42b (step S208).

As noted above, the setter 41b of the second embodiment sets a third range wider than the second range as the range of variable values corresponding to points to be changed with respect to the operation schedule before the change. The setter 42b uses the variable values of the third range corresponding to points to be changed to establish the operation schedule of the device 2.

By doing this, the schedule determination device 4b and the schedule determination program of the second embodiment can cause the display 43 to display points to be changed with respect to the operation schedule before the change. The schedule determination device 4b and the schedule determination program of the second embodiment can make the case in which the operation schedule cannot be executed relatively rare.

The schedule determination device 4b and the schedule determination program of the second embodiment can establish an operation schedule that reflects a manual adjustment made by the equipment operator of the device 2. The schedule determination device 4b and the schedule determination program of the second embodiment enable the equipment operator to operate the device 2 with better efficiency and stability, in accordance with the situation. The schedule determination device 4b and the schedule determination program of the second embodiment can cause the equipment operator to obtain an incentive in accordance with a demand response.

The determiner 42b of the second embodiment determines whether or not the indexes of a new operation schedule satisfy the constraint conditions and, if the indexes of the new operation schedule do not satisfy the constraint conditions, gives notification of information indicating that the indexes of the new operation schedule do not satisfy the constraint conditions. If the indexes of the new operation schedule do not satisfy the constraint conditions, the determiner 42b makes notification of information indicating the cause of the indexes of the new operation schedule not satisfying the constraint conditions and of information indicating constraint conditions that the new operation schedule indexes can satisfy. If the indexes of the new operation schedule do not satisfy the constraint conditions, the determiner 42b changes the constraint conditions to establish an operation schedule.

The determiner 42b of the second embodiment determines whether or not an incentive can be obtained if the new operation schedule is executed by the device and, if an incentive cannot be obtained, gives notification of information indicating that an incentive cannot be obtained. If an incentive cannot be obtained, the determiner 42b gives notification of information indicating the cause that the incentive cannot be obtained. If an incentive can be obtained, the determiner 42b may remove the cause of not being able to obtain an incentive to establish the operation schedule.

Third Embodiment

In the third embodiment, the schedule determination device 4 being provided with a simulator that simulates the operation schedule of the device 2 is the point of difference with respect to the first embodiment and the second embodiment. In the third embodiment, only the point of difference with respect to the first embodiment and the second embodiment will be described.

Figure 17:
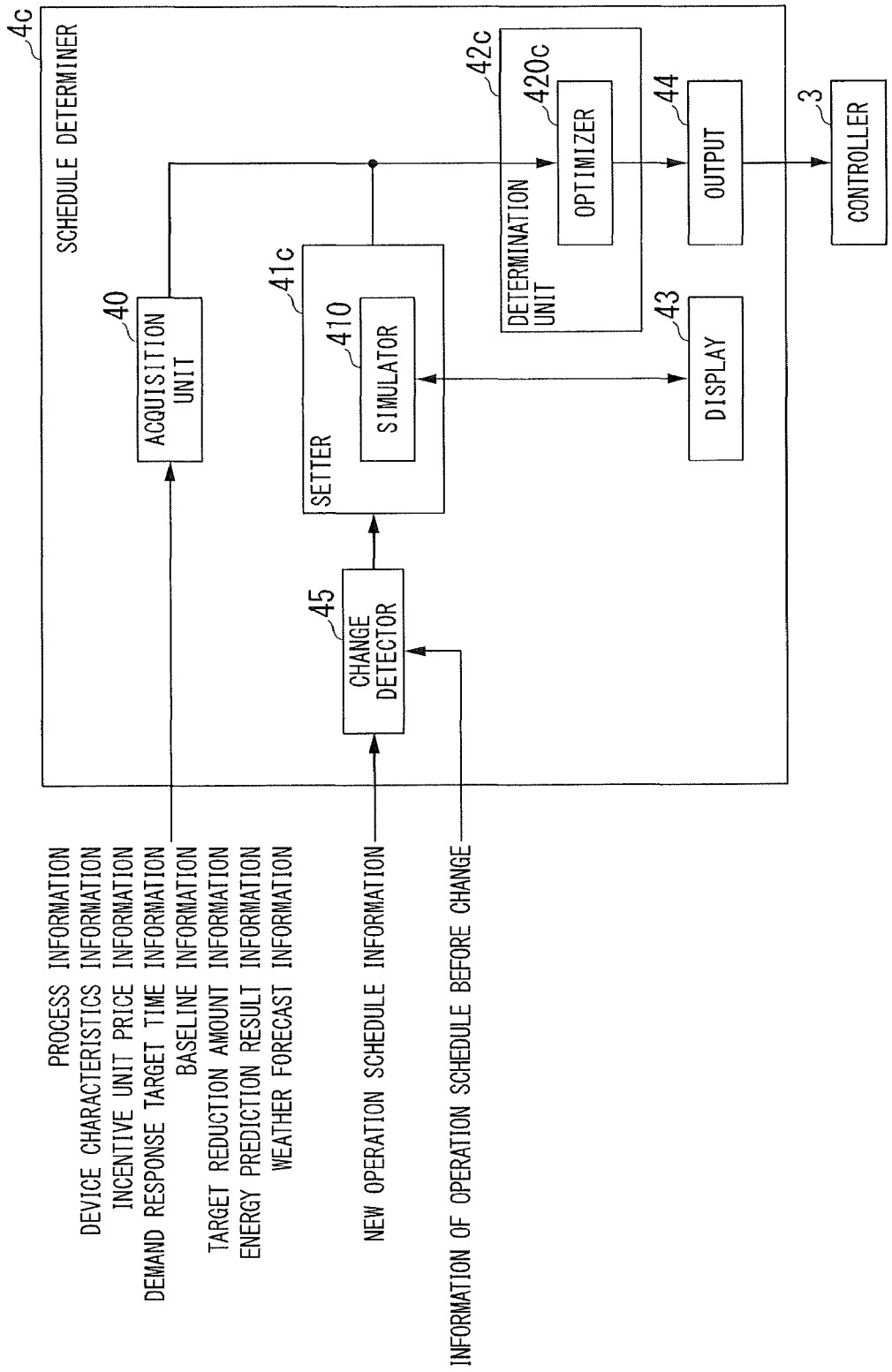
FIG. 17 shows a schedule determination device of a third embodiment.

FIG. 17 shows the schedule determination device 4 of the third embodiment (hereinafter called the "schedule determination device 4c"). The schedule determination device 4c has an acquisitor 40, a setter 41c, a determiner 42c, a display 43, an output 44, and a change detector 45. The setter 41c has a simulator 410. The determiner 42c has an optimizer 420c.

A part or all of the acquisitor 40, the setter 41c, the determiner 42c, and the change detector 45 is a software functional unit that functions by a processor such as a CPU executing a program stored in memory. A part or all of the functional units may be a hardware functional unit such as an LSI device or an ASIC circuit.

The acquisitor 40, the setter 41c, the determiner 42c, and the change detector 45 may have a volatile memory such as a RANI or a register. The acquisitor 40, the setter 41c, the determiner 42c, and the change detector 45 may have a non-volatile memory (non-temporary recording medium) such as a ROM, a flash memory, or a hard-disk drive. The non-volatile memory stores a program for the purpose of operating a processor such as a CPU.

The simulator 410 obtains from the change detector 45 information indicating an operation schedule before a change and information indicating a new operation schedule. The simulator 410, based on the information indicating the operation schedule before the change and information indicating the new operation schedule, simulates the operating state of the device 2. The simulator 410 outputs information indicating the results of simulating the operating state of the device 2 to the determiner 42c.

The simulator 410 determines whether or not information indicating readjustment has been obtained from the display 43. If information indicating readjustment has been acquired from the display 43, the simulator 410 again acquires from the change detector 45 information indicating the operation schedule before the change and information indicating the new operation schedule. If information indicating readjustment has been acquired from the display 43, the simulator 410 again performs a simulation of the operating state of the device 2. The simulator 410 outputs to the optimizer 420c information indicating the results of the re-simulation of the state of the device 2.

The simulator 410 simulates the operating state of the device 2, based on, for example, a detailed simulation model of the energy flow in a plant. The simulator 410 may, based on the difference between the operation schedule before the change and the new operation schedule, and on a pre-established simple rule, change the values of variables that establish the constraint conditions to establish the setting values of the device 2. This rule is, for example, a rule whereby, the output of a heat-sourcing device if the heat-sourcing device goes newly into the on state by a change made by the equipment operator shares the outputting of another heat-sourcing device that has been already in the on state. This rule is only one example and may be different, depending upon the configuration of the plant and the device characteristics.

Figure 18:
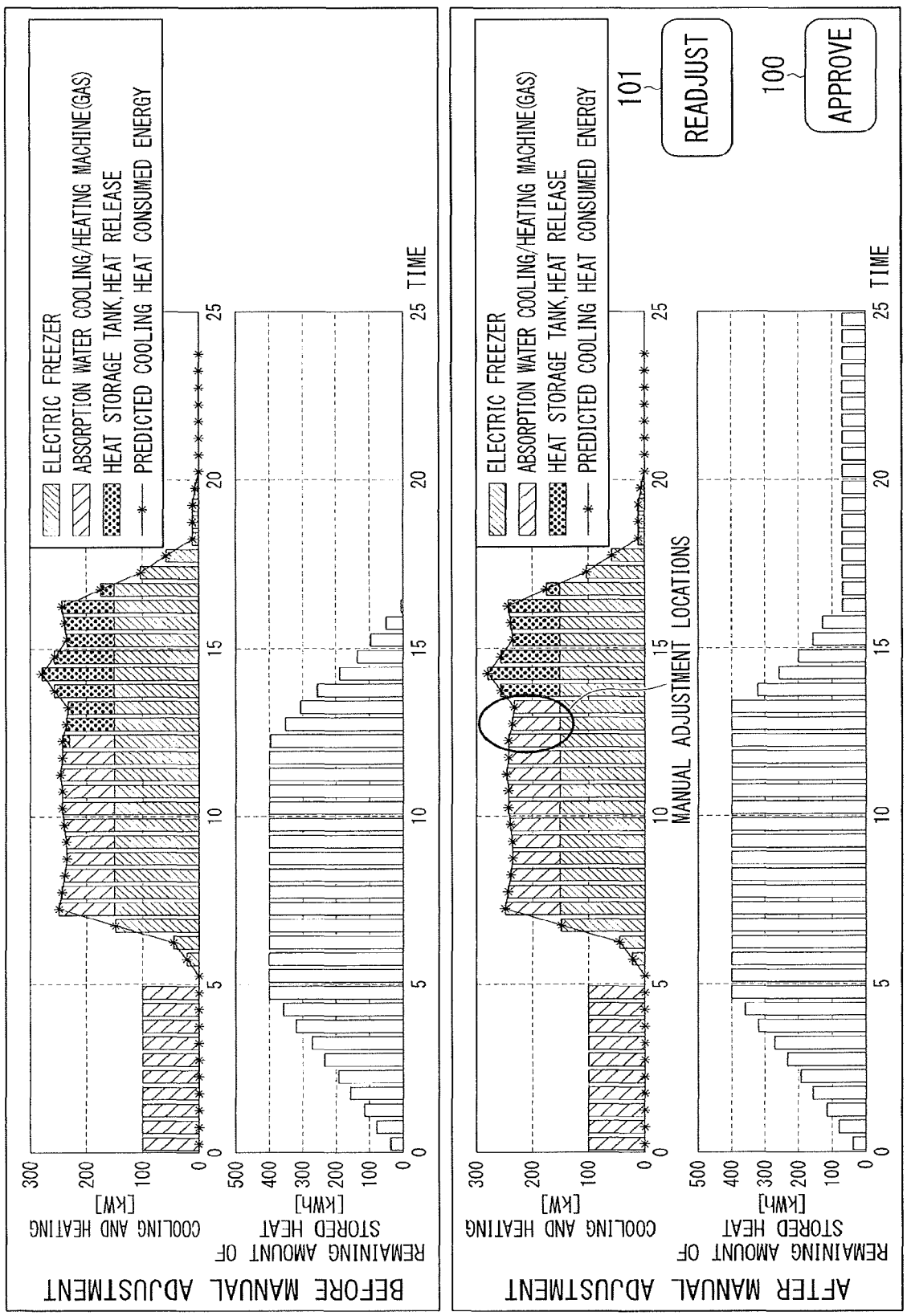
FIG. 18 shows a display of a new operation schedule in the third embodiment.

FIG. 18 shows a new operation schedule in the third embodiment. In the graphs of FIG. 18, the first vertical axis represents cooling and heating, and the second vertical axis represents the remaining stored heat. The horizontal axes represent time. In the graphs of FIG. 18 the first vertical axis represents cooling and heating, and the second vertical axis represents the remaining stored heat. The upper part of FIG. 18 is an image representing an operation schedule of the device 2 before a change made by the equipment operator of the device 2. The lower part of FIG. 18 is an image representing the operation schedule of the device 2 after a change (manual adjustment) made by the equipment operator of the device 2.

The operating key 100 displayed with the character string "Approve" is displayed on the display screen of the display 43.

The operating key 100 is for the purpose of outputting information indicating approval to the optimizer 420c. The operating key 101 displayed with the character string "Readjust" is displayed on the display screen of the display 43. The operating key 101 is for the purpose of outputting information indicating approval to the optimizer 420c. The operation schedule of the device 2 after the change made by the equipment operator of the device 2 has an overlaid image of points that were changed (manually adjusted points) by the equipment operator of the device 2 indicated by enclosure in an ellipse.

The operation schedule of the device 2 before the change and the new operation schedule of the device 2 are displayed on the same display screen. By doing this, the equipment operator of the device 2 can quantitatively grasp how the operation schedule of the device 2 or the state of a plant will change in accordance with the new operation schedule. The equipment operator of the device 2 can simply grasp how the operation schedule of the device 2 or the state of a plant will change in accordance with the new operation schedule.

If the equipment operator of the device 2 verifies the operation schedule displayed on the display 43 and approves the operation schedule of the device 2, the operating key 100 with the character string "Approve" can be pressed. If the equipment operator of the device 2 verifies the operation schedule displayed on the display 43 and wishes to readjust the operation schedule of the device 2, the operating key 101 displayed with the character string "Readjust" can be pressed to give an instruction to change the operation schedule.

If an operation is made with respect to the operating key 100, the display 43 outputs information indicating approval to the determiner 42c. If an operation with respect to the operating key 101 is detected, the display 43 outputs information indicating readjustment to the simulator 410.

The optimizer 420c acquires from the simulator 410 information indicating the results of simulation of the operating state of the device 2. The optimizer 420c establishes the operation schedule of the device 2 so as to achieve the simulation results from the simulator 410. If setting values are calculated that enable the achievement of the simulation results from the simulator 410, the optimizer 420c causes the display 43 to display information indicating the established operation schedule. The optimizer 420c outputs to the output 44 information indicating the setting values in accordance with the established operation schedule.

Figure 19:
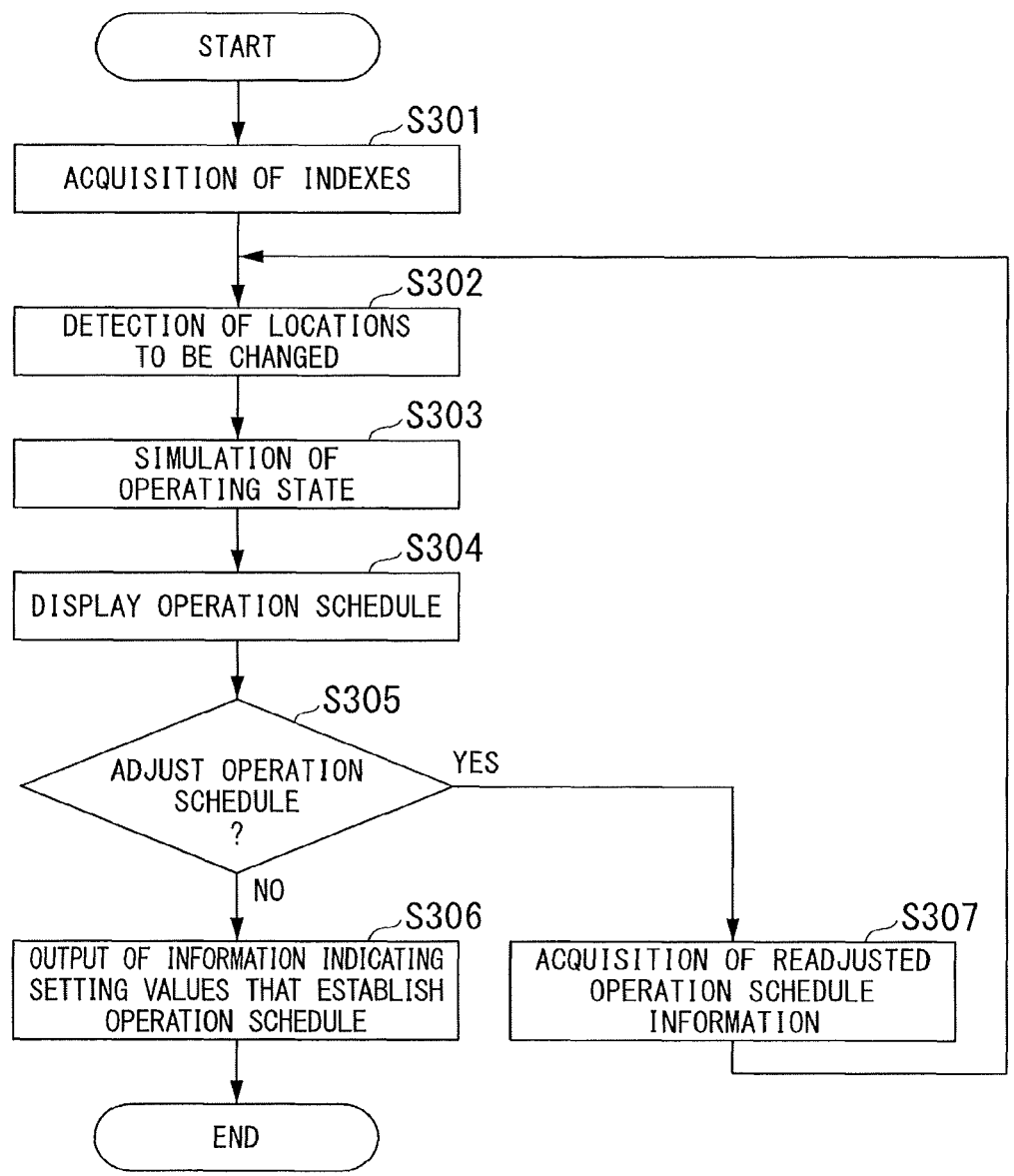
FIG. 19 shows the operation of a schedule determination device of the third embodiment.

FIG. 19 shows the operation of the schedule determination device 4c of the third embodiment. The schedule determination device 4c executes the operation shown in FIG. 19 if the equipment operator of the device 2 has changes the operation schedule.

The acquisitor 40 acquires index information (step S301).

The change detector 45 detects a location at which a change will be made to the operation schedule before the change (step S302).

The simulator 410 simulates the operating state of the device 2, based on information indicating the operation schedule before the change and information indicating the new operation schedule (step S303).

The display 43 displays an image representing the operation schedule simulated by the simulator 410 (step S304).

The simulator 410 determines whether or not information indicating readjustment has been acquired form the display 43. That is, the simulator 410 determines whether or not to adjust the operation schedule (step S305).

If information indicating readjustment is not acquired from the display 43 (NO at step S305), the optimizer 420c establishes the operation schedule of the device 2 so as to achieve the simulation results from the simulator 410. The optimizer 420c outputs to the output 44 information indicating the setting values in accordance with the established operation schedule. The output 44 outputs to the controller 3 information indicating the setting values in accordance with the operation schedule established by the determiner 42c (step S306).

If information indicating readjustment has been acquired from the display 43 (YES at step S305), the acquisitor 40 acquires information indicating the operation schedule that has been changed again, as information indicating a new operation schedule. The acquisitor 40 proceeds to the processing of step S302.

As noted above, the schedule determination device 4c of the third embodiment has an optimizer 420c and a simulator 410. The simulator 410, based on information indicating an operation schedule before a change and information indicating a new operation schedule, simulates the operating state of the device 2. The optimizer 420c of the determiner 42c establishes an operation schedule of the device 2 so as to achieve the simulation results from the simulator 410.

By doing this, the schedule determination device 4c and the schedule determination program of the third embodiment can properly establish an operation schedule.

The schedule determination device 4c and the schedule determination program of the third embodiment, by simulating the operating state of the device 2 based on operation schedules before and after a change, can properly establish an operation schedule that reflects manual adjustments, by simple calculation processing. The schedule determination device 4c and the schedule determination program of the third embodiment can cause an equipment operator to be able to obtain an incentive in accordance with a demand response.

The schedule determination device 4c and the schedule determination program of the third embodiment enable the equipment operator to operate the device 2 with better efficiency and stability, in accordance with the situation.

The schedule determination program may be recorded in a computer-readable recording medium. The computer-readable recording medium is, for example, a removable medium, such as a flexible disk, an opto-magnetic disk, a ROM, a CD-ROM, or a flash memory, or a storage device such as a hard disk built into a computer system. The schedule determination program may be transmitted via an electrical communication circuit.

According to at least one of the embodiments described above, by having a determiner that uses variable values within a second range to establish an operation schedule of the device, an operation schedule can be properly established.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A schedule determination device comprising:
an acquisitor configured to acquire indexes of an operation schedule of a device and constraint conditions of the indexes, wherein the indexes are target functions using an optimization problem solving algorithm stored in memory;
a setter configured to set a second range, which is narrower than a first range set in the operation schedule before a change, as a range for values of variables that establish constraint conditions of indexes of a new operation schedule adjusted manually, wherein the setter sets the second range so that the operation schedule actually executed does not exceed a new operation schedule adjusted manually;
a determiner configured to determine the operation schedule of the device, by using the variable values within the second range;
wherein it is determined that the new operation schedule adjusted manually is not executable, the setter sets a third range wider than the second range as the range of variable values corresponding to locations to be changed with respect to the operation schedule before the change; and
wherein it is determined that the new operation schedule adjusted manually is not executable, the determiner uses the variable values of the third range corresponding to locations to be changed to determine the operation schedule of the device.

2. The schedule determination device according to claim 1, wherein
the setter is configured to set a third range, which is wider than the second range, as a range for the values of variables corresponding to points at which a change is to be made with respect to the operation schedule before the change, and
the determiner is configured to the operation schedule of the device, using the variable values within the third range corresponding to the points to be changes.

3. The schedule determination device according to claim 2, wherein the determiner is configured to determine whether or not an incentive is obtainable if the new operation schedule is caused to be executed by the device and, the determiner is configured to make a notification that the incentive is not obtainable if the incentive is not obtainable.

4. The schedule determination device according to claim 3, wherein the determiner is configured to make notification of the cause of the incentive being not obtainable, if the incentive is not obtainable.

5. The schedule determination device according to claim 1, wherein the determiner is configured to determine whether or not the indexes of the new operation schedule satisfy the constraint conditions, and the determiner is configured to make, if the indexes of the new operation schedule do not satisfy the constraint conditions, a notification that the indexes of the new operation schedule do not satisfy the constraint conditions.

6. The schedule determination device according to claim 5, wherein the determiner is configured to make a notification of the cause that the indexes of the new operation schedule not satisfying the constraint conditions and a notification of the constraint conditions that the indexes of the new operation schedule can satisfy, if the indexes of the new operation schedule do not satisfy the constraint conditions.

7. The schedule determination device according to claim 6, wherein the determiner is configured to determine whether or not an incentive is obtainable if the new operation schedule is caused to be executed by the device and, the determiner is configured to make a notification that the incentive is not obtainable if the incentive is not obtainable.

8. The schedule determination device according to claim 7, wherein the determiner is configured to make notification of the cause of the incentive being not obtainable, if the incentive is not obtainable.

9. The schedule determination device according to claim 5, wherein the determiner is configured to determine whether or not an incentive is obtainable if the new operation schedule is caused to be executed by the device and, the determiner is configured to make a notification that the incentive is not obtainable if the incentive is not obtainable.

10. The schedule determination device according to claim 9, wherein the determiner is configured to make notification of the cause of the incentive being not obtainable, if the incentive is not obtainable.

11. The schedule determination device according to claim 1, wherein the determiner is configured to change the constraint conditions to determine the operation schedule, if the indexes of the new program do not satisfy the constraint conditions, changes the constraint conditions to establish the operation schedule.

12. The schedule determination device according to claim 11, wherein the determiner is configured to determine whether or not an incentive is obtainable if the new operation schedule is caused to be executed by the device and, the determiner is configured to make a notification that the incentive is not obtainable if the incentive is not obtainable.

13. The schedule determination device according to claim 12, wherein the determiner is configured to make notification of the cause of the incentive being not obtainable, if the incentive is not obtainable.

14. The schedule determination device according to any one of claim 1 to claim 11, wherein the determiner is configured to determine whether or not an incentive is obtainable if the new operation schedule is caused to be executed by the device and, the determiner is configured to make a notification that the incentive is not obtainable if the incentive is not obtainable.

15. The schedule determination device according to claim 14, wherein the determiner is configured to make notification of the cause of the incentive being not obtainable, if the incentive is not obtainable.

16. The schedule determination device according to claim 1, wherein the determiner is configured to display, on a display, a graph representing the operation schedule before a change and a graph representing the new operation schedule.

17. A non-transitory computer-readable storage medium that stores a schedule determination program for causing a computer to perform at least:
- acquiring indexes of an operation schedule of a device and constraint conditions of the indexes, wherein the indexes are target functions using an optimization problem solving algorithm stored in memory;
- setting a second range, which is narrower than a first range set in the operation schedule before a change, as a range for values of variables that establish constraint conditions of indexes of a new operation schedule adjusted manually, wherein setting the second range so that the operation schedule actually executed does not exceed a new operation schedule adjusted manually;
- determining the operation schedule of the device, by using the variable values within the second range;
- wherein it is determined that the new operation schedule adjusted manually is not executable, setting a third range wider than the second range as the range of variable values corresponding to locations to be changed with respect to the operation schedule before the change; and
- wherein it is determined that the new operation schedule adjusted manually is not executable, using the variable values of the third range corresponding to locations to be changed to determine the operation schedule of the device.

18. A schedule determination method comprising:
- acquiring indexes of an operation schedule of a device and constraint conditions of the indexes, wherein the indexes are target functions using an optimization problem solving algorithm stored in memory;
- setting a second range, which is narrower than a first range set in the operation schedule before a change, as a range for values of variables that establish constraint conditions of indexes of a new operation schedule adjusted manually, wherein setting the second range so that the operation schedule actually executed does not exceed a new operation schedule adjusted manually;
- determining the operation schedule of the device, by using the variable values within the second range;
- wherein it is determined that the new operation schedule adjusted manually is not executable, setting a third range wider than the second range as the range of variable values corresponding to locations to be changed with respect to the operation schedule before the change; and
- wherein it is determined that the new operation schedule adjusted manually is not executable, using the variable values of the third range corresponding to locations to be changed to determine the operation schedule of the device.

* * * * *